Feb. 1, 1955 A. C. DAVIS 2,701,085

CASE FILLING MACHINE

Filed Oct. 26, 1950 17 Sheets-Sheet 1

INVENTOR.
Allan C. Davis
BY
Thomas W. Y. Clark
Attorney

Feb. 1, 1955 | A. C. DAVIS | 2,701,085

CASE FILLING MACHINE

Filed Oct. 26, 1950 | 17 Sheets-Sheet 2

INVENTOR.
Allan C. Davis
BY
Thomas W. Y. Clark
Attorney

Feb. 1, 1955 A. C. DAVIS 2,701,085

CASE FILLING MACHINE

Filed Oct. 26, 1950 17 Sheets-Sheet 3

INVENTOR.
Allan C. Davis
BY
[signature]
Attorney

INVENTOR.
Allan C. Davis
BY
Thomas W. Y. Clark
Attorney

CASE FILLING MACHINE

Filed Oct. 26, 1950 17 Sheets-Sheet 5

INVENTOR.
Allan C. Davis
BY
Thomas W. Y. Clark
Attorney

Feb. 1, 1955 A. C. DAVIS 2,701,085

CASE FILLING MACHINE

Filed Oct. 26, 1950 17 Sheets-Sheet 6

INVENTOR.
Allan C. Davis.
BY
Thomas W. Y. Clark
Attorney

CASE FILLING MACHINE

Filed Oct. 26, 1950

INVENTOR.
Allan C. Davis
BY
[signature]
Attorney

INVENTOR.
Allan C. Davis.
BY
Thomas W. Y. Clark
Attorney

Feb. 1, 1955 A. C. DAVIS 2,701,085

CASE FILLING MACHINE

Filed Oct. 26, 1950 17 Sheets-Sheet 9

INVENTOR.

Allan C. Davis

BY

Thomas W. Y. Clark

Attorney

Feb. 1, 1955

A. C. DAVIS 2,701,085

CASE FILLING MACHINE

Filed Oct. 26, 1950

17 Sheets-Sheet 10

INVENTOR.
Allan C. Davis
BY
Thomas W. Y. Clark
Attorney

Feb. 1, 1955 A. C. DAVIS 2,701,085

CASE FILLING MACHINE

Filed Oct. 26, 1950 17 Sheets-Sheet 11

INVENTOR.
Allan C. Davis
BY
Thomas W. Y. Clark
Attorney

INVENTOR.
Allan C. Davis
BY
Thomas W. Y. Clark
Attorney

Feb. 1, 1955 A. C. DAVIS 2,701,085

CASE FILLING MACHINE

Filed Oct. 26, 1950 17 Sheets-Sheet 13

INVENTOR.

Allan C. Davis

BY

Thomas W. Y. Clark

Attorney

Feb. 1, 1955 A. C. DAVIS 2,701,085

CASE FILLING MACHINE

Filed Oct. 26, 1950 17 Sheets-Sheet 14

INVENTOR.
Allan C. Davis
BY
Thomas W. Y. Clark
Attorney

Feb. 1, 1955 A. C. DAVIS 2,701,085

CASE FILLING MACHINE

Filed Oct. 26, 1950 17 Sheets-Sheet 15

INVENTOR.
Allan C. Davis
BY
Thomas W. Y. Clark
Attorney

Feb. 1, 1955 A. C. DAVIS 2,701,085

CASE FILLING MACHINE

Filed Oct. 26, 1950 17 Sheets-Sheet 16

INVENTOR.

Allan C. Davis

BY

Thomas W. J. Clark

Attorney

INVENTOR.
Allan C. Davis
BY
Thomas W. Y. Clark
Attorney

United States Patent Office 2,701,085

Patented Feb. 1, 1955

2,701,085

CASE FILLING MACHINE

Allan C. Davis, Baltimore, Md., assignor to The Davis Caser Company, Baltimore, Md., a corporation of Maryland Application October 26, 1950, Serial No. 192,210

43 Claims. (Cl. 226—14)

This invention relates to improvements in a case filling machine and particularly to a machine for delivering a group or a charge comprising a plurality of rows of similarly shaped articles, such as bottles or cans, simultaneously to a partitioned container, which may be called a cell case and in this application this term will be used to include any type of partitioned container and also, bottles will be referred to but it is understood that the machine will equally well handle other similarly shaped articles.

The machine is designed for completely automatic operation and is provided with numerous safety devices which insure the proper uninterrupted operation of the machine.

A feature of the invention, particularly advantageous in filling cell cases, is a novel conveyor for forming the articles into rows, arranged and separated from each other according to the arrangement and spacing of the rows of cells of a case.

A further feature of the invention is the novel guide structure for separating the individual articles in forming each row.

A still further feature of the invention is the novel charge collecting or grouping device which permits forming a charge spaced in correspondence to the cells of a case to be filled.

Another important feature of the invention is the provision of a novel charge receiving and depositing device or basket particularly adapted to the handling of charges of relatively fragile articles, which device positively holds and then lowers a charge from the charge collecting device to a cell case on a conveyor and it fills the cases while they remain on the conveyor.

The means for positioning the cases on the conveyor below the charge depositing mechanism and for feeding the cases to and from that position are novel features of the invention.

A few of the outstanding features and objects of the invention having been enumerated, others will be apparent in the specific embodiment and certain modifications thereof which will hereinafter be described, with the aid of the accompanying drawings forming a part hereof, and in which.

In the drawings similar numerals refer to similar parts throughout the several views.

Figure 1:
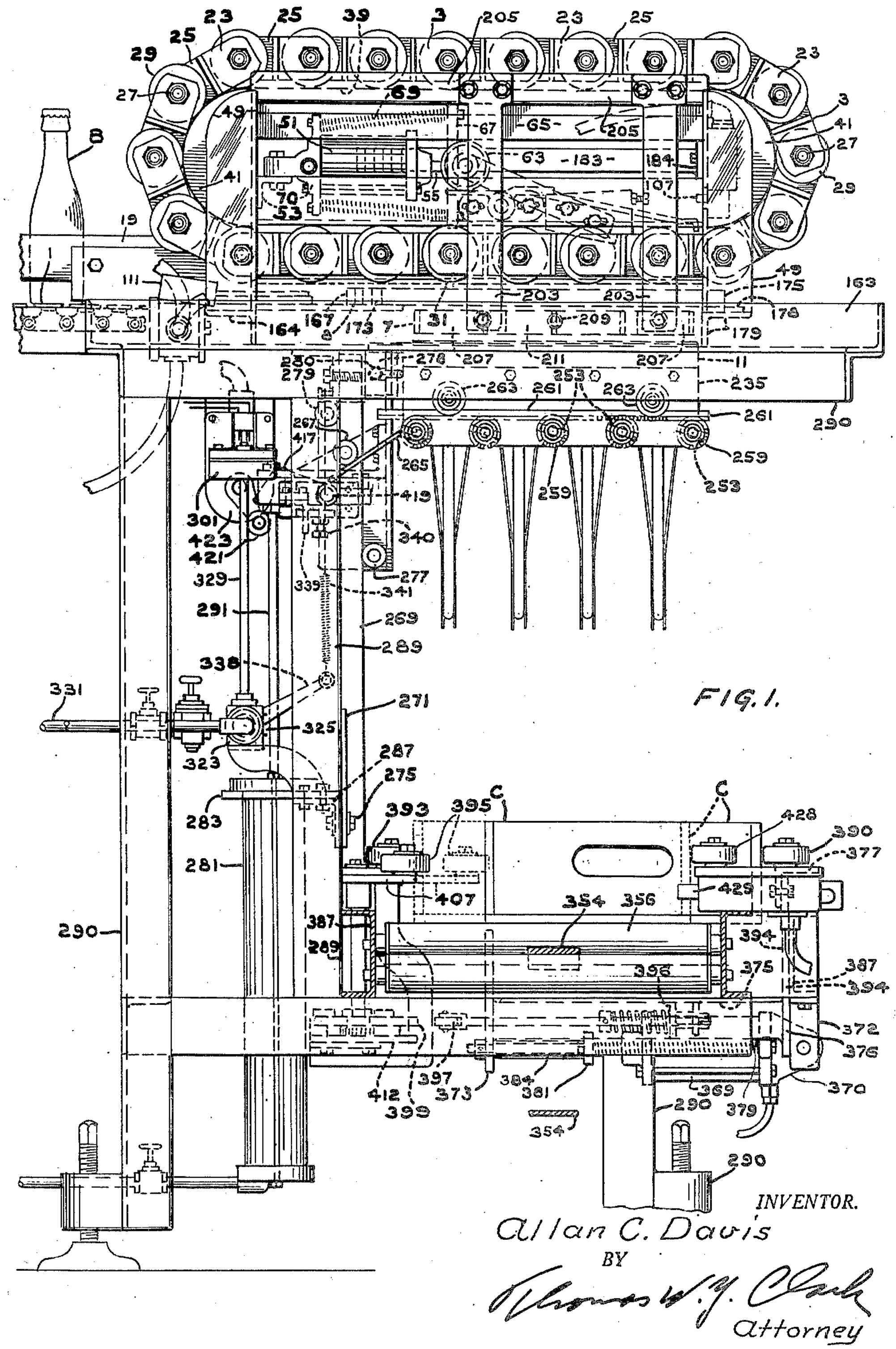
Figure 1 is a left side elevation of a bottle case filling machine constructed in accordance with the invention.
Figure 2:
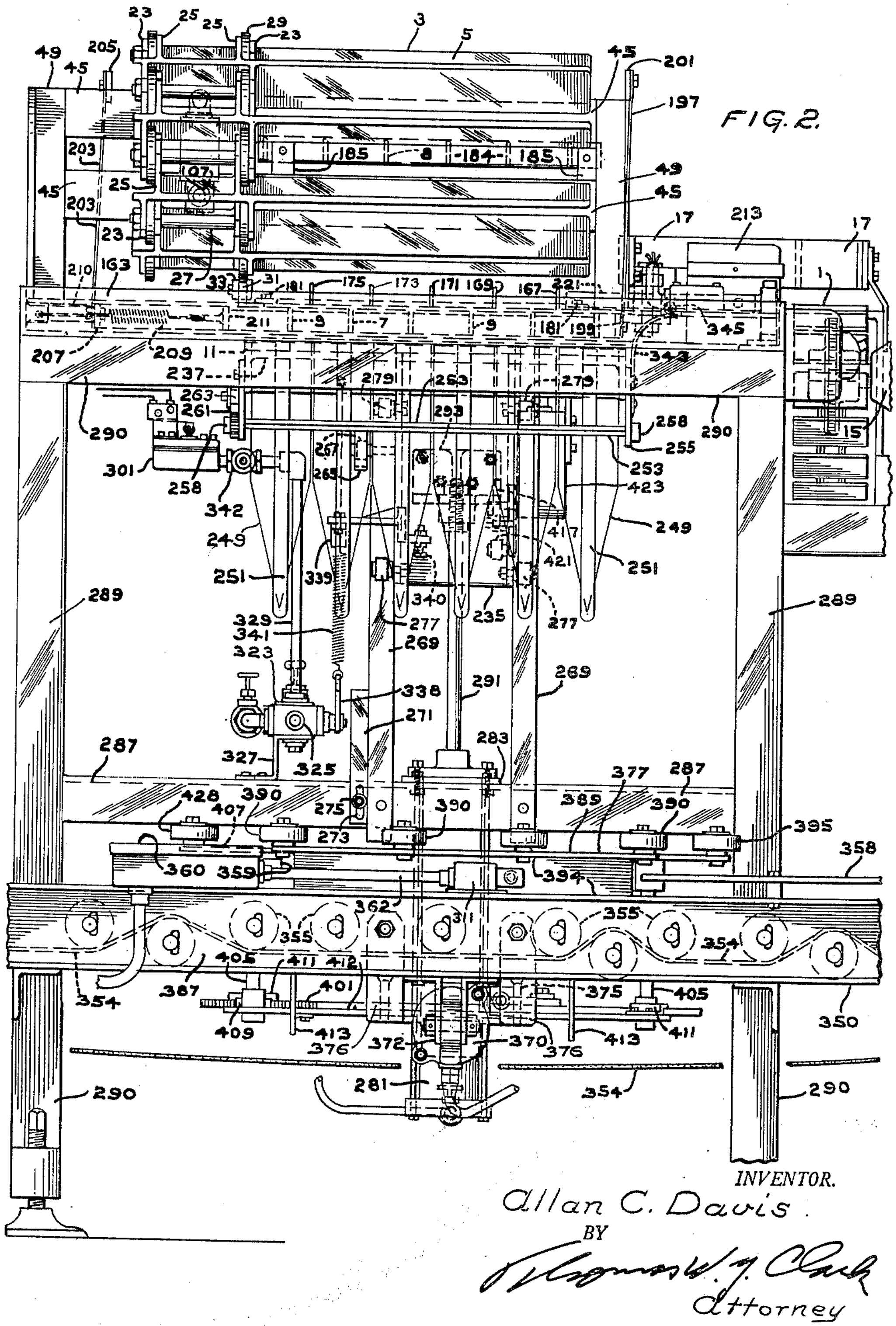
Figure 2 is a front elevational view of the machine.
Figure 3:
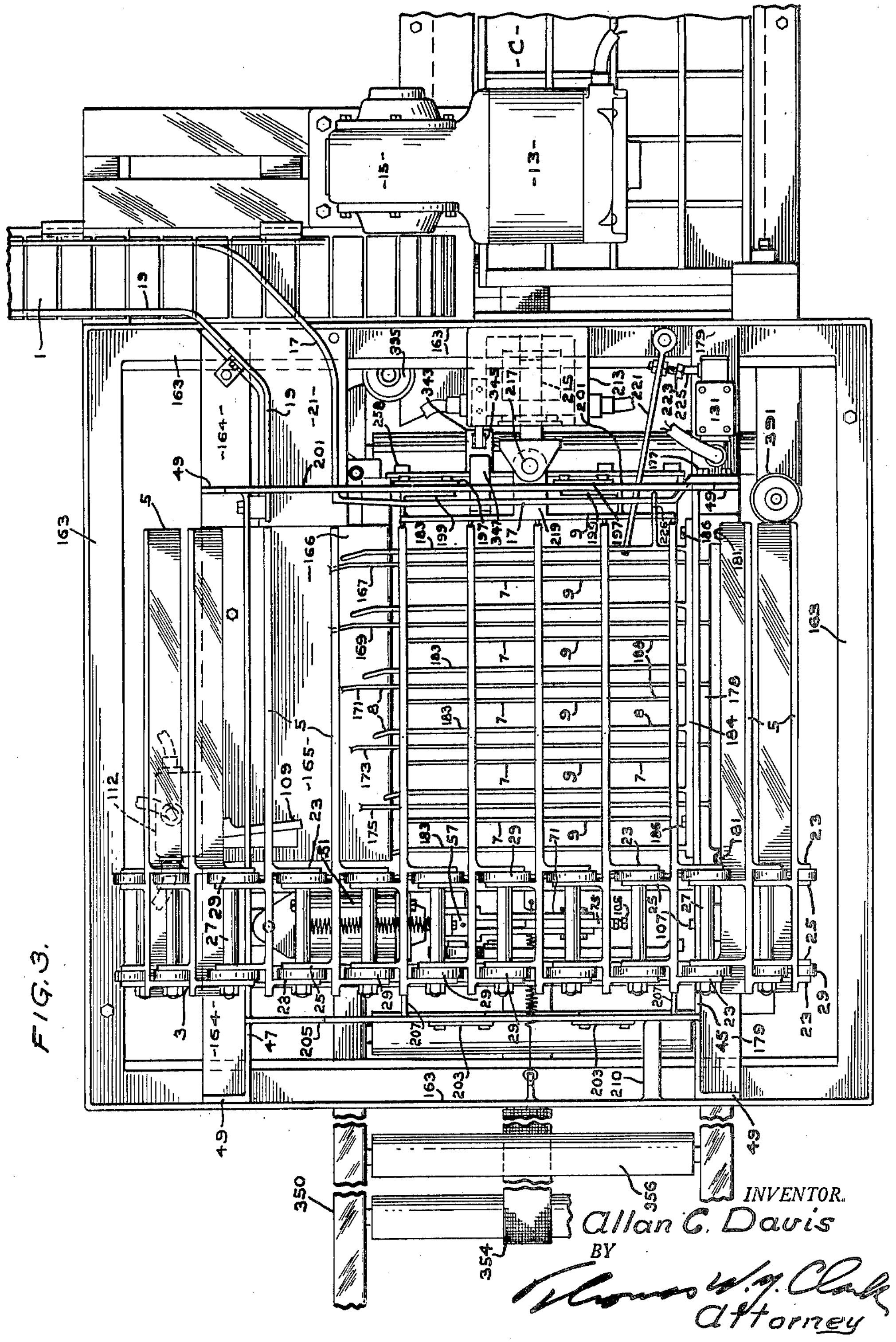
Figure 3 is a top plan view.

Briefly, referring to Figures 1 to 4, bottles B enter the machine on the right side at the rear in a single line from a supply or conveyor 1, see Figure 3. A delivery member or chain conveyor 3 having flights 5 receives a predetermined number of the bottles into the compartments between each successive pair of flights in upright position and advances them forwardly over a charge collecting device comprising a grid 7 and upper and lower guide structures 8, see also Figures 8 and 10.

When the desired number of rows of bottles are on the grid to form a charge, longitudinal grid members or rails 9 of the grid are shifted laterally to position the bottles to drop through the grid vertically upon the further movement of the flight into a charge receiving device or basket 11. The basket or receptacle is then lowered to deposit the bottles into a waiting receiver or case C having partitions P, Figure 13, forming cells. The machine illustrated is entirely automatic, having control devices to initiate and coordinate the various steps in its operation.

In greater detail, the bottle feed conveyor 1 is driven by means of motor 13 through reduction gearing 15. Guides 17 and 19 divert the bottles from the conveyor onto a platform 21 on which the bottles move between the flights 5 of the chain conveyor 3. The bottle conveyor 1 acts impositively on the bottoms of the bottles so that when the initial feed row or stage 165 of the chain conveyor is full, the bottle conveyor slides under the bottles until the next row or stage of the chain conveyor is presented.

Figure 4:
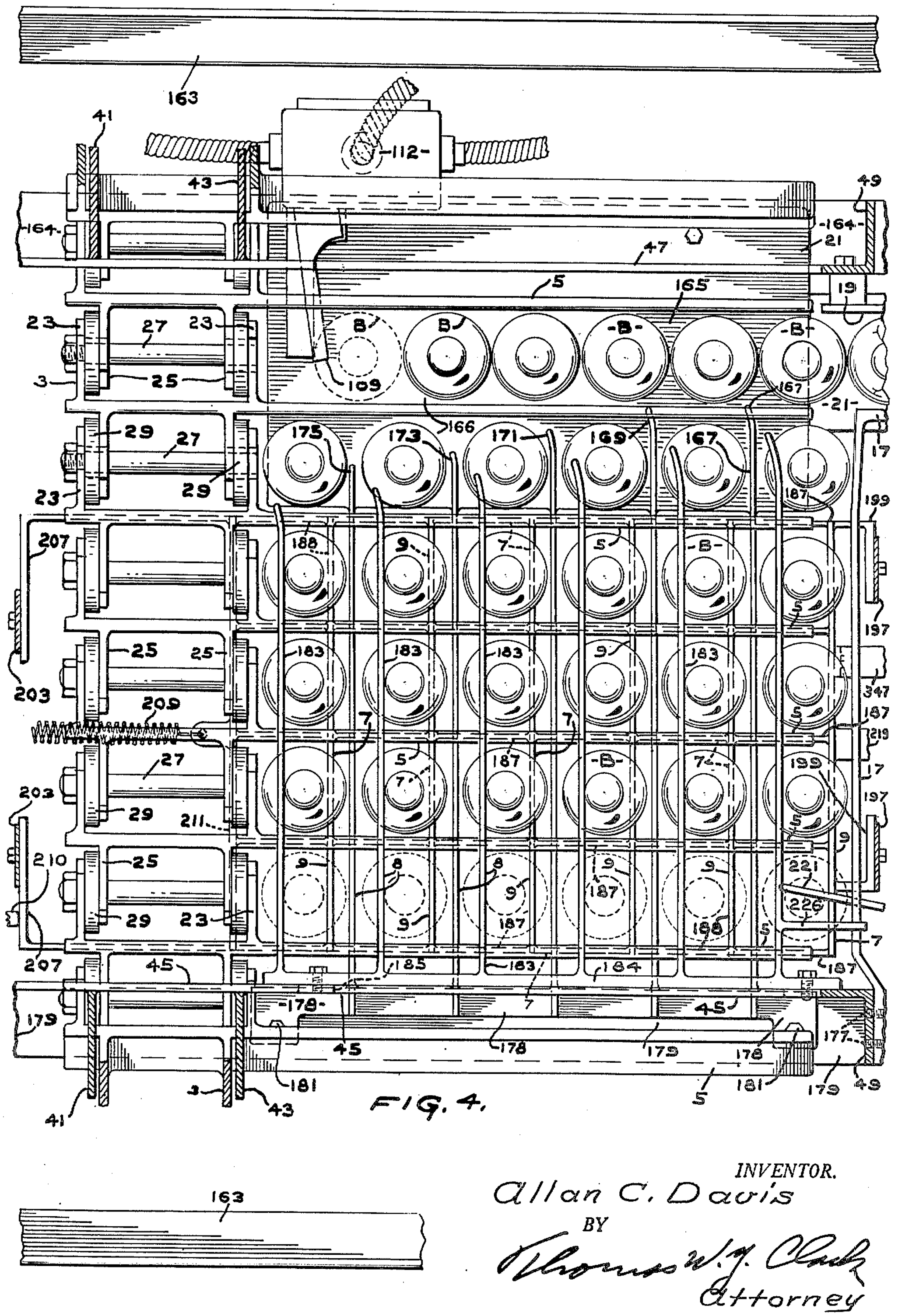
Figure 4 is a partial horizontal sectional view.
Figure 7:
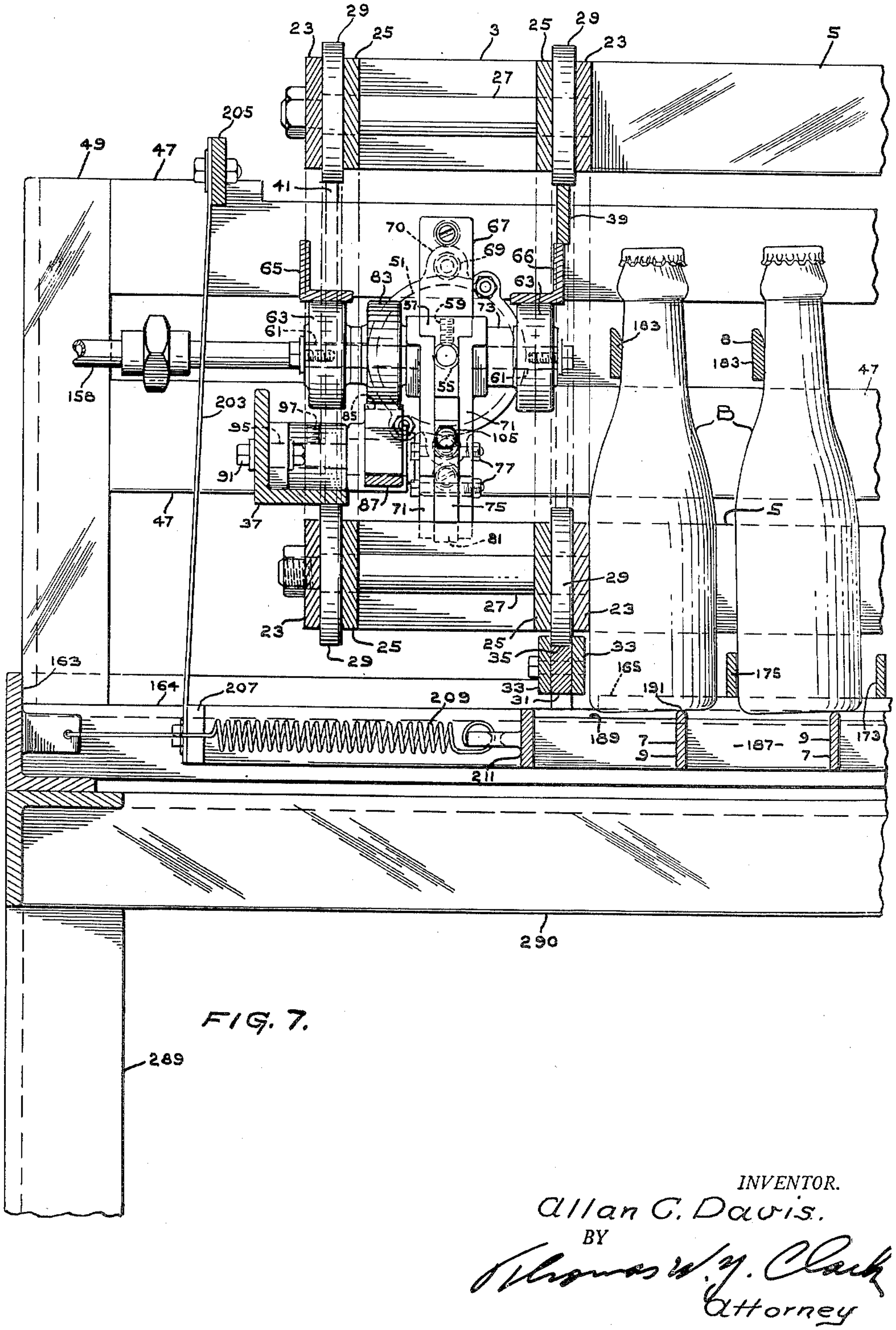
Figure 7 is a partial transverse sectional view taken along the line 7—7 of Figure 6.

The chain conveyor 3 which is illustrated in Figures 1 and 7 rides on rollers about a generally elliptical track and engages the bottles when in the lower horizontal track portion, returning rearwardly above the bottles. The flights 5 have at their left ends oppositely projecting pairs of flanges 23 and 25 engaging the axles 27 of pairs of rollers 29. As seen in Figures 3 and 4, the rearwardly directed pairs of flanges 23 engage the axles 27 on the outside of the rollers and the front pairs of flanges 25 engage the axles on the inside of the rollers. Thus each flight 5 is supported by the two pairs of rollers.

As best seen in Figure 7 the lower horizontal track for chain conveyor 3 comprises a lower support member 31 having side guide pieces 33 projecting above to form a channel 35 in which the inner roller 29 of each pair rides and an upper angle iron 37 for the outer rollers. This angle iron 37 counteracts the tendency of the opposite ends of the bars to swing downwardly due to their unbalanced weight. The upper track comprises a single inner guide member 39 which is sufficient as a support because of the lateral rigidity of the chain. At each end of the track are semi-circular plates 41, 43, Figures 1, 5 and 6, supported by front and rear crosspieces 45, 47 and uprights 49 of the frame of the machine.

Figures 5, 6:
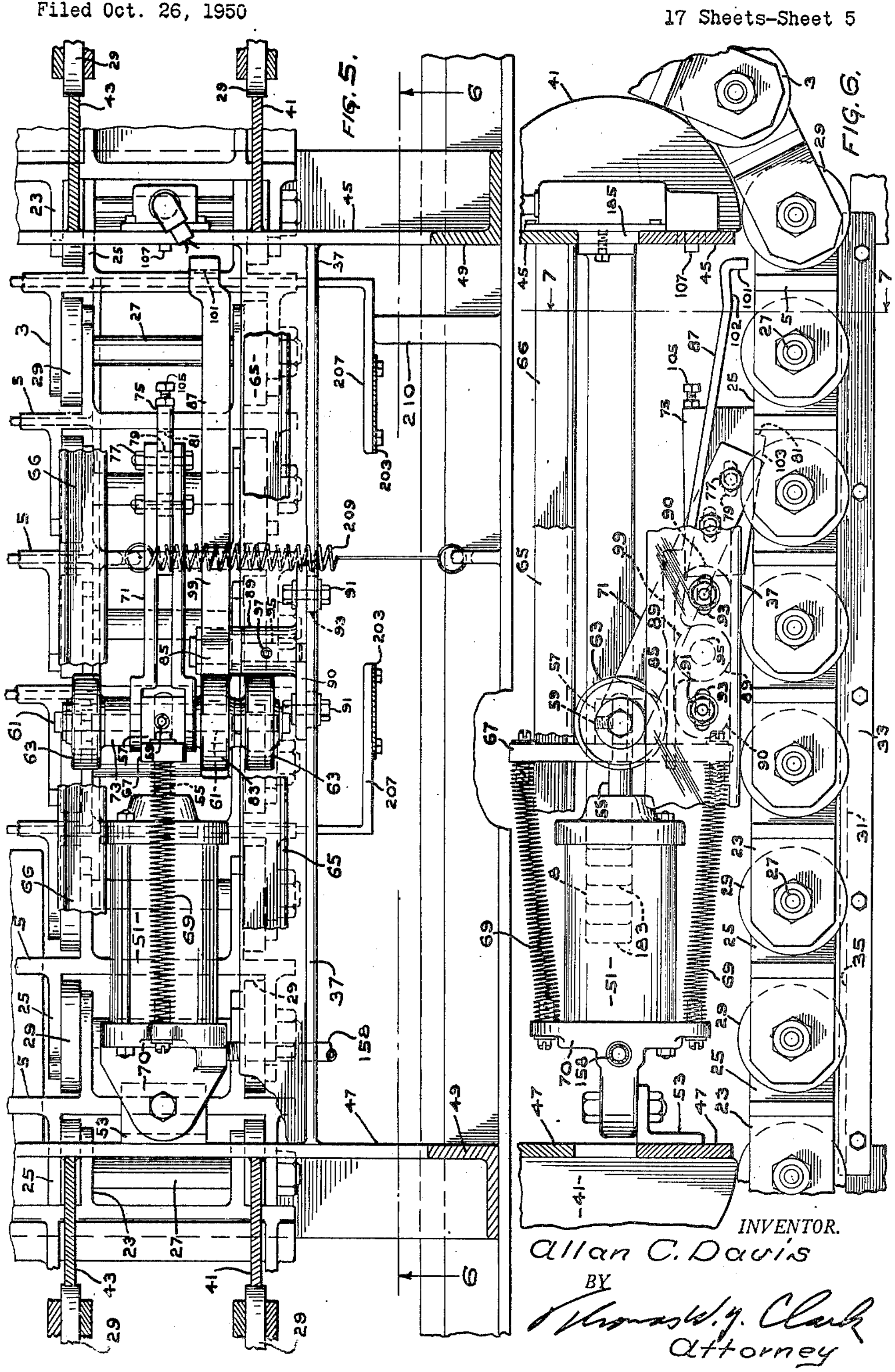
Figure 5 is a partial horizontal sectional view illustrating the means for moving the bottle pusher conveyor step-by-step.
Figure 6 is a partial longitudinal sectional view taken along the line 6—6 of Figure 5.

The mechanism for intermittently driving the chain conveyor 3 is shown in detail in Figures 5, 6 and 7. A pneumatic cylinder 51 is mounted on the rear crosspiece 47 by means of a bracket 53. The piston rod 55 of the cylinder connects with block 57 in which it is fastened by means of screw 59. The block has a shaft 61 extending from each side thereof which carries at its outer ends wheels 63. The wheels 63 ride on overhead longitudinal angle members 65, 66, Figure 7, fastened to upper front and rear crosspieces 45 and 47. A vertical bar 67 is also carried by the block providing a support for the front ends of springs 69 extending between the bar 67 and cylinder mount 70 which provides a support for the rear ends of the springs, the cylinder mount in turn being carried by bracket 53. The shaft 61 loosely carries a yoke 71 straddling the block, the right fork of the yoke being spaced from the right wheel 63 by means of a collar 73. The yoke 71 carries at its forward end a pusher plate 75, Figure 6, held in adjustable position between the fork members by means of bolts 77 and slots 79 of the plate. The pusher plate 75 has a notch 81 which is adapted to engage the flights 5 intermediate of the pairs of rollers 29 carried thereby. On the left of block 57 between the block and left wheel 63 is a roller 83 riding on a cam surface 85 of the chain stop bar 87. This bar, having a hook 101 at its forward end, is supported by means of a hub 89 fastened by its base 90 to angle iron 37 by bolts 91 and slots 93. A pin 95 fixed in the hub by means of screw 97 mounts the stop bar pivotally thereon. The front end of this freely pivoted bar is overbalanced in relation to its rear end and the front or hooked end tends to swing downwardly into the path of the moving pusher bar. As the piston moves forwardly, see Figure 6, the roller or follower 83 functions as a moving lift when moving or positioned to the rear of pin 95 and therefore holds the hooked end of the bar raised, when the roller 83 is moving forward, slightly past the center of pivot pin 95 the hooked end 101 is allowed to swing down by gravity. This is a critically timed operation and takes place very near the end of the forward stroke of the pusher plate 75. At this time an impetus is given to the hook movement by the impact of the roller 83 with the raised portion 99 of the cam surface 85. The timing of these elements is such that, just as the flight member 5, in moving forwardly, begins to pass under the flat horizontal surface 102 of the hook member the stop-bar 87 quickly swings downwardly, causing the surface 102 to engage the top of the flight bar 5 in a positive manner due to the initial engagement and impact of the roller 83 with the cam raised portion 99, for the purpose of preventing any undue rebound or disengagement of the hook assembly from the top of the flight bar member. In this respect it will be noted the flight bar member 5 has nearly reached the end of its movement and travels only a very short distance after the hook moves down before it comes to a positive stop through engagement with the hook 101, reducing possible disengagement, due to the rebound or the like, to a minimum.

The chain stop bar 87 thus controls the forward movement and position of the chain conveyor 3 and can be adjusted to accurately stop the forward movement of the chain conveyor. Springs 69 serve to return the piston rod 55 to its initial position when the exhaust valve of the cylinder is opened, causing the plate 75 to be withdrawn and to ride up over the next flight just to the rear of the one engaged by notch 81 by means of sloped under-surface 103 thereof, Figure 6, and causing the notch portion 81 to drop into engagement with the said next flight to the rear under its own weight when the piston is sufficiently retracted. Roller 83 rides back on surface 85 as the piston is retracted and raises hook 101 out of engagement with the flight 5 adjacent thereto. The chain drive or pusher plate 75 is thus in position for another forward stroke of the piston rod 55.

A screw 105 in plate 75 projects forwardly thereof and is so adjusted that when pusher plate 75 reaches the end of its forward travel, a button 107 is depressed by the screw 105. This button 107 is associated with the control circuit for exhausting the air from cylinder 51 for the chain drive which will hereinafter be described.

Figure 20:
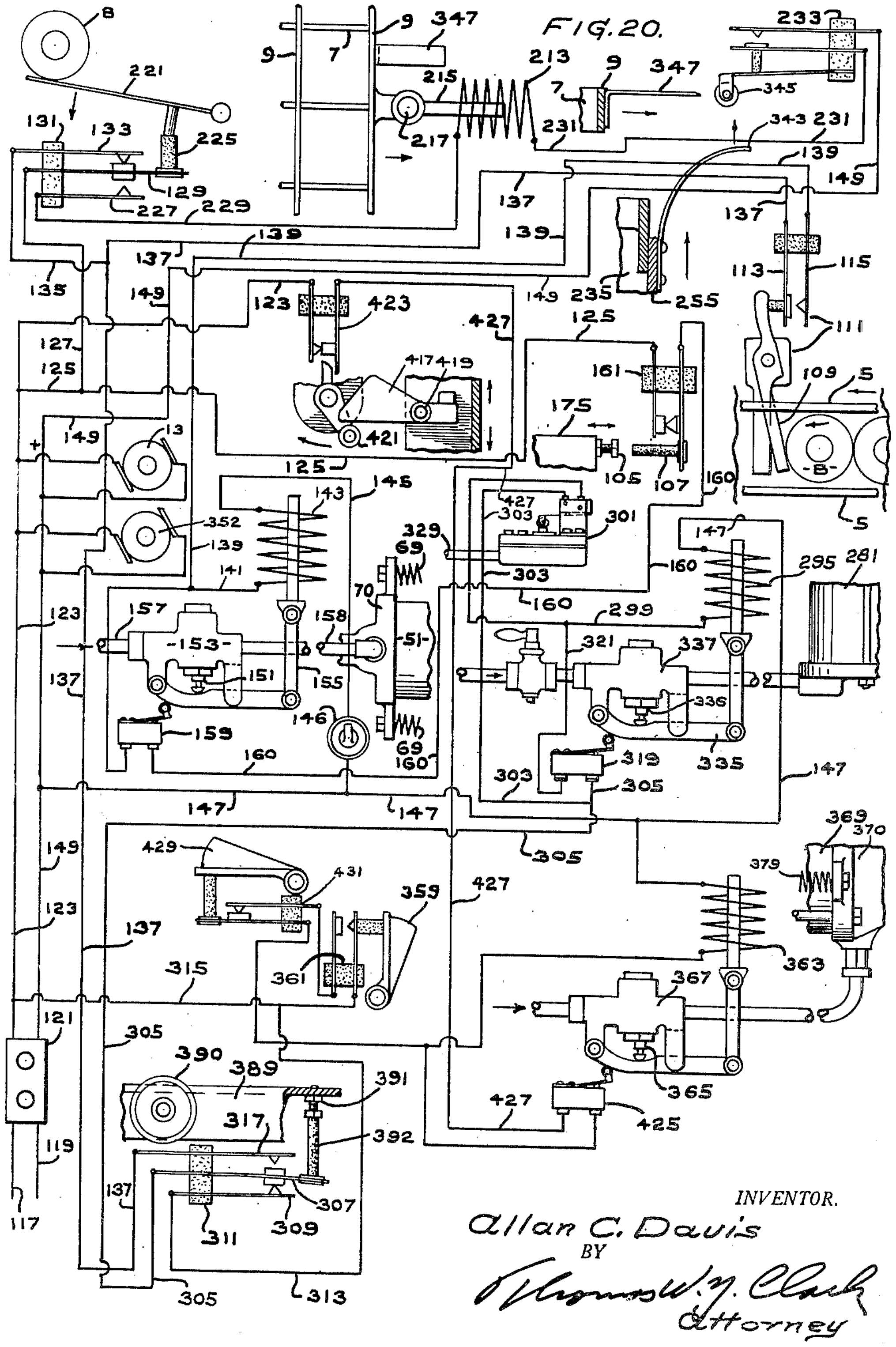
Figure 20 is a diagrammatic view illustrating the electric control circuits for the machine.
Figure 21:
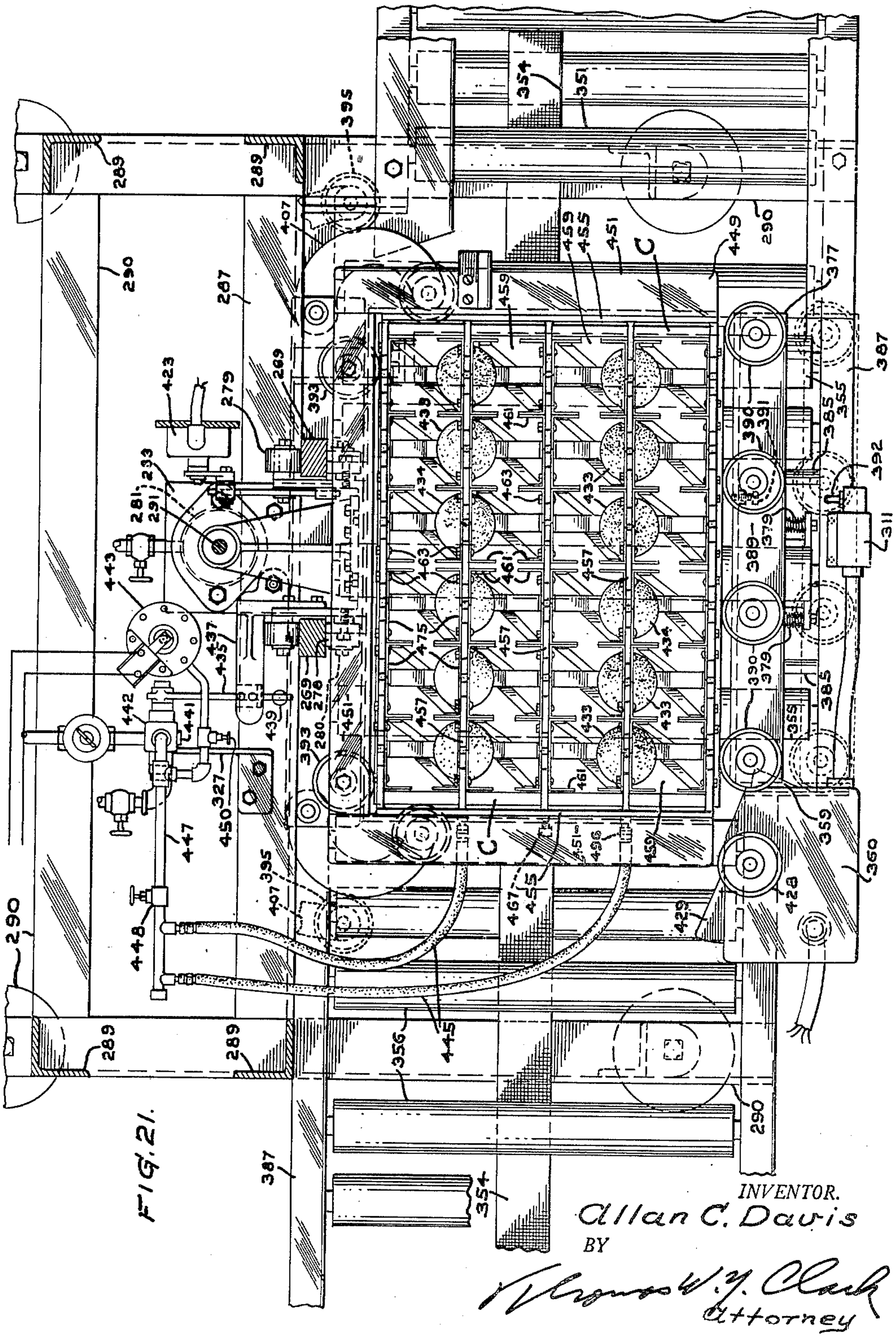
Figure 21 is a partial horizontal sectional view similar to Figure 12 illustrating a modified basket or bottle receiving and depositing mechanism, but with the case pusher shifted to position a case.

Referring to Figures 3 and 4, the machine is illustrated as designed for six bottles in each row, it will be seen that as the sixth bottle moves into a row in the chain conveyor 3 from the bottle conveyor 1, the first bottle on the left contacts a switch arm 109 actuating a switch 111 in terminal box 112 to initiate one of the respective intermittent movements, or steps of the chain conveyor 3. Referring to Figure 20, wherein the switch arm 109 and switch 111 are diagrammatically illustrated in the upper right portion of the drawing, it will be observed that before chain actuating switch arm 109 is moved, contacts 113 and 115 are normally open. When the switch 111 is actuated and contacts 113 and 115 are closed, the circuit may be traced from supply conductor 117 in the lower left of the drawing through switch 121 and from conductor 123 to branch 125, conductor 127, to center contact 129 of said actuating switch 131 shown in a normal position of rest in the upper left of the drawing. If this switch is in the position shown, upper contact 133 and conductors 135 and 137 lead to switch 111. From thence the circuit returns through contacts 113 and 115, conductors 139, 141, chain pusher solenoid 143, conductor 145, safety cut-off pusher switch 146, conductors 147 and 149 through switch 121 to supply conductor 119 to complete the circuit. The chain pusher solenoid 143 is thus actuated upon the normal contact of a bottle with the pusher switch contact arm 109 which closes the relief valve 151 of three-way valve 153 by means of linkage 155 and opens the pressure supply line. The air supply line 157 is thus opened to pipe 158 to supply air to cylinder 51, to step the chain conveyor. Linkage 155 also closes sustaining switch 159. As soon as the row of bottles actuating switch 111 is moved forward, contacts 113 and 115 return to normal open position, so that it is necessary to have a sustaining circuit to insure completion of the stroke of piston rod 55. This circuit extends from the lower terminal of solenoid 143 through conductor 141, sustaining switch 159, conductor 160, pusher return switch 161 associated with screw 105 of pusher plate 175 and button 107, conductors 125 and 123 to supply conductor 117. It will be apparent that this circuit is broken by switch 161 at the end of travel of the pusher plate 75, and piston rod 55 due to the depressing of button 107 of the pusher switch 161. When the circuit is broken solenoid 143 releases, the relief valve 151 is opened and air supply line 157 is closed to exhaust air from line 158. Piston rod 55 is then retracted by springs 69.

The means for guiding the bottles as they move forward with the chain conveyor 3 is best seen in Figures 3, 4, 8, 9, 10 and 11.

The platform 21 which first receives the bottles from the bottle feed conveyor 1 is supported on the rectangular frame base 163 and crosspiece 164 thereof. Connected to the platform 21 and in the same horizontal plane, Figure 3, is the support or stage 165 onto which the bottles slide upright and in a row into the compartments 166 between successive flights 5. When the chain conveyor 3 moves the flights 5 forward, the row of bottles therebetween slides forward over the stage 165 and into the guide structure 8. The last or sixth bottle of the column as it moves forward strikes the longest lower longitudinal guide of structure 8, comprising an elongated strip 167 slightly bent at its infeed end. The end of the guide deflects the sixth bottle toward the right of the machine and the other five bottles to the left. The next longest longitudinal guide or strip 169 contacts the fourth bottle as it is still moving to the left and further displaces the first four bottles. This action continues for each of the successively shorter guides or strips 171, 173 and 175. As seen in Figures 3 and 4, guide 17, which diverts the bottles from bottle conveyor 1, extends along the right side of the machine as an outer guide for the sixth bottle of each row, and is secured forwardly to upright 49 by screws 177. At the end of one step forward of the chain conveyor 3 the bottles are separated from each other by the lower longitudinal guides 167 to 175. These lower guides are carried by support 165 and base 178 and are mounted on the crosspieces 164 and 179 of frame 163 by means of bolts 181, Figure 3.

When the row of bottles is again advanced, the bottles leave stage 165 and ride on the longitudinal grid rails or members 9 of grid 7. Corresponding bottles of successive rows form columns extending longitudinally of the machine, and adjacent pairs of guides 167—169, 169—171, etc. form channels for the columns. The grid members or rails 9 are arranged in alignment with the columns.

Figure 8:
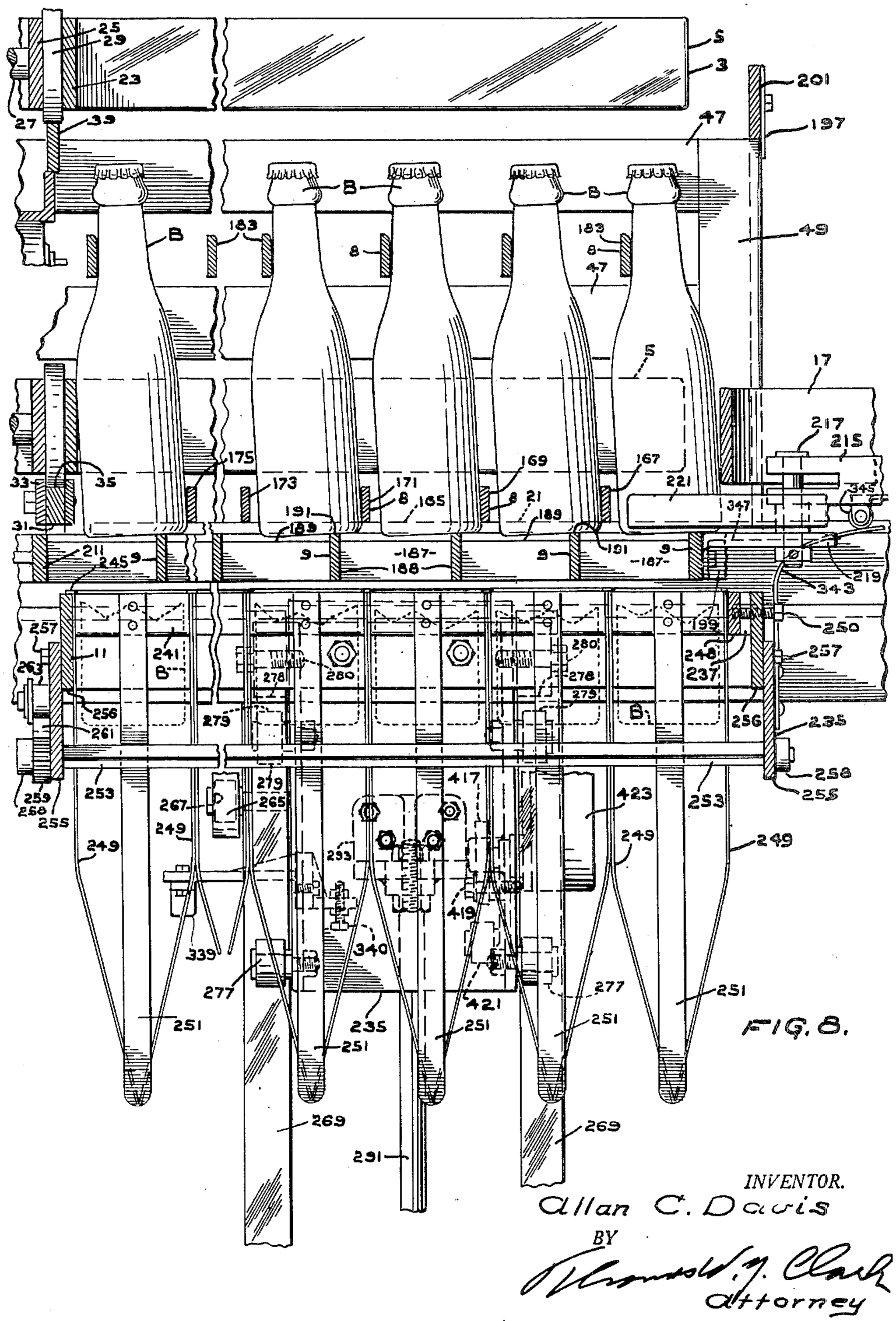
Figure 8 is a partial fragmentary transverse sectional view at the front of the machine.

As seen in Figures 4 and 8 the bottles are supported to the right of their centers by grid members 9 so that they lean slightly to the left, each bottle being supported at its neck by longitudinal support bars 183. The slight tilting of the bottles insures that the bottles will not rock in other directions and therefore results in greater uniformity in the handling of the bottles, reducing the possibility of breakage.

Figure 9:
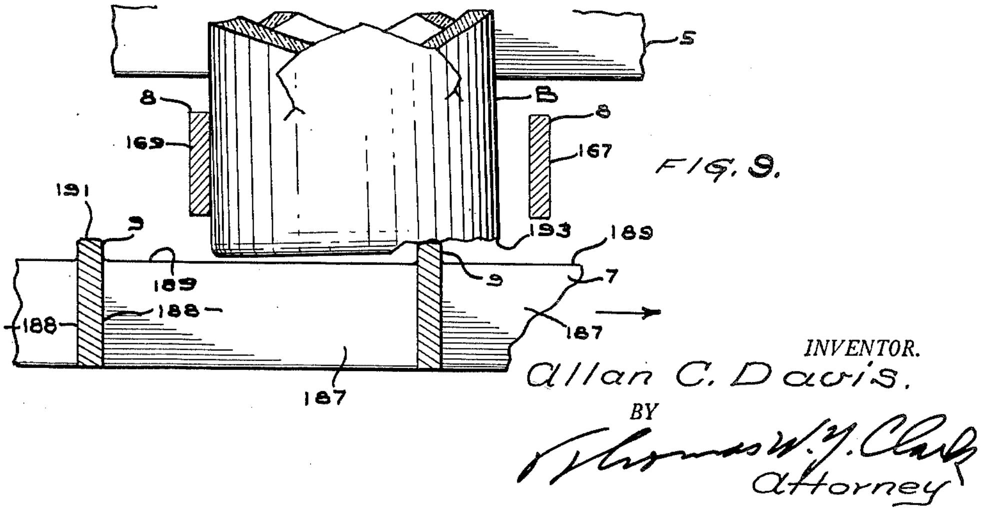
Figure 9 is an enlarged partial sectional view of a portion of Figure 8 illustrating a bottle with a chipped bottom passing through the machine.

The upper support bars 183 carried by cross-brace 184 are fastened at the front of the machine to crosspieces 45 by means of bridging strips 185, Figure 2. The grid members 9 are carried by cross members 187 which are spaced the same as the flights 5 to form with members 9 openings 188 corresponding to the cells of a case. The top edges 189 of these cross members of the grid are below the upper longitudinal surfaces 191 of the longitudinal grid members, so that the lower left portion of the bottoms clear the cross members. As illustrated in Figure 9, this clearance is present even if the bottom of the bottle is chipped at the point of contact with the longitudinal grid members as indicated by reference numeral 193.

As seen in Figures 3, 4, 7 and 8, the grid 7 is swingingly supported at the right by hangers 197 fastened by means of angle brackets 199 to the right longitudinal grid member, the hangers being suspended from an upper longitudinal brace 201, extending between upper crosspieces 45 and 47. Similarly on the left hangers 203 are suspended from longitudinal brace 205 and carry grid 7 by means of angle brackets 207. The grid is thus so suspended that it can swing transversely of the direction of movement of the rows of bottles pushed by the chain conveyor 3. As best shown in Figure 7, a spring 209 is attached centrally of longitudinal end member 211 of grid 7 and to the rectangular frame 163 on the left side of the machine. This spring 209 holds the grid against the frame stop member 210 in the position shown on Figures 4, 7, 8 and 10, with the grid rails 9 in alignment with the advancing columns of bottles to receive the bottoms of the bottles of each column.

Referring to Figures 3 and 8, a solenoid 213 is mounted on the rectangular frame 163 at the right of the machine and centrally of the grid. The armature 215 of the solenoid is forked at its projecting end and receives a pin 217 therethrough attached to arm 219 carried centrally of right longitudinal grid member 9. Thus when the solenoid is energized, the armature 215 is retracted to the right, swinging the grid transversely against the resistance of spring 209 to register rails 9 of the grid with the guides 167, 169, etc.

In Figures 3 and 4 are illustrated the switch lever 221 pivotally mounted to the right of the machine on rectangular frame 163. This lever is rotated by the sixth bottle, of the first row as the chain conveyor 3 advances the fourth row of six bottles onto the grid. An adjustable contact comprising a screw 223 is mounted on the lever to actuate switch 131 by means of button 225 prior to the stopping of the chain conveyor. As shown in Figure 20, the contacts 129 and 133 of this switch are opened and contact 129 and lower contact 227 are closed. Since the sustaining circuit for solenoid 143 is independent of switch 131, the chain conveyor continues its operation until its stopping switch 161 is actuated. However, a step or an intermittent movement of the chain conveyor cannot be initiated while contacts 129 and 133 are open.

The closing of contacts 129 and 227 connects supply conductor 117 through conductors 123, 125, 127 and 229 to solenoid 213 at the top of the drawing, and from thence through conductor 231, switch 233 when closed and conductor 149 to supply conductor 119 to actuate the solenoid to swing the grid 7 to the right.

The right hand longitudinal support bar 183 has near its front end a transversely extending steadying arm 226. When the right hand forward bottle strikes switch lever 221, near the bottom of the bottle, the bottle may tilt forward, and arm 226 keeps it upright.

Figures 10, 11:
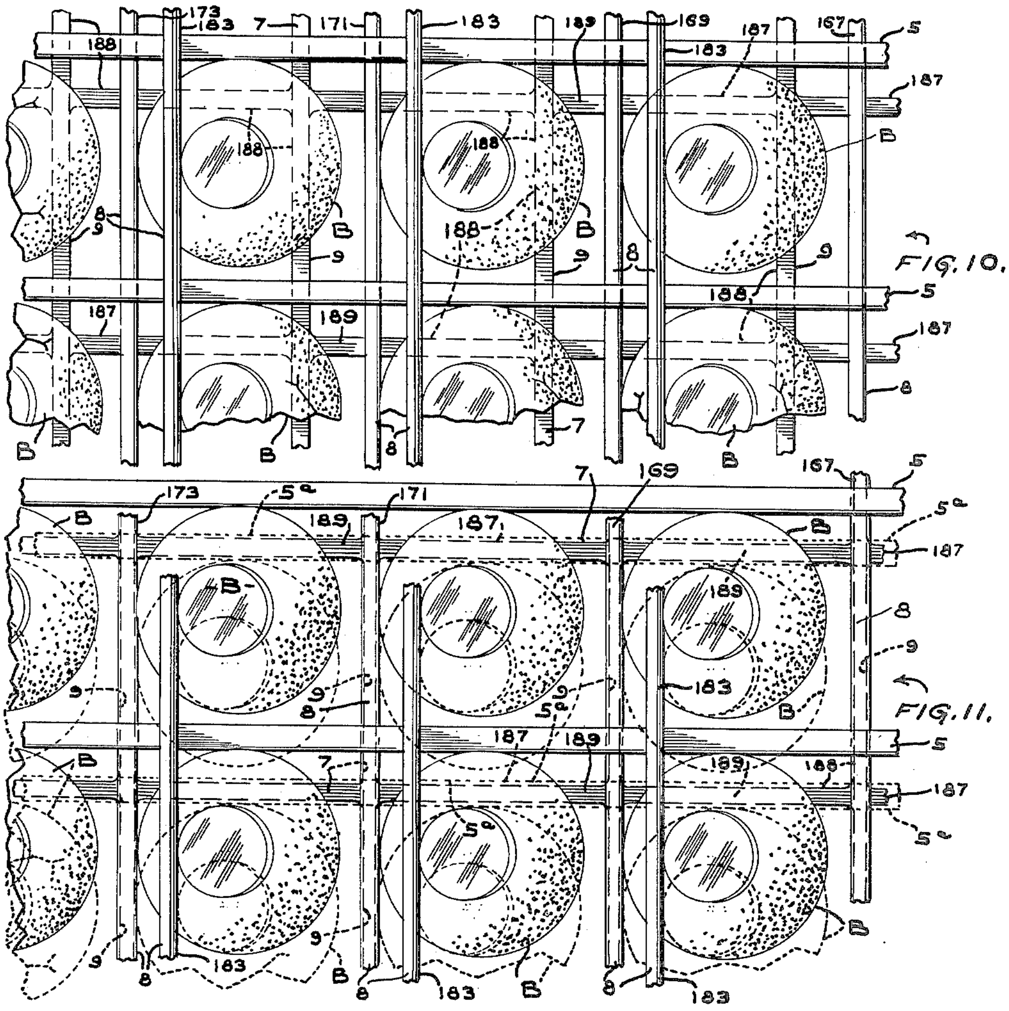
Figure 10 is an enlarged partial horizontal view of the grid and conveyor positions during an advance of the conveyor.
Figure 11 is a view similar to Figure 10, after the grid has shifted but before the conveyor has completed its advance, the final position of the conveyor when the bottles fall being illustrated in dotted outline.

Figures 10 and 11 illustrate the preferred sequence of operations wherein the grid is shifted while the bottles are still being advanced. With the bottles moving as shown in Figure 11 after the grid has been shifted, that is, with grid rails 9 in registration with the respective guide members 167 to 175 prior to the registration of cross members 187 with flights 5, any tendency to unbalance is overcome and the bottles drop promptly through openings 188 of the grid into the basket after flights 5, and the articles advanced thereby, have come into complete registration with openings 188.

In Figure 10, the bottles are shown just prior to the shifting of the grid, the bottles moving forward under the urging of the flights 5 and riding on the longitudinal grid members 9 above grid cross members 187. Figure 11 illustrates in solid outline the condition just after the shifting of the grid. The bottles have dropped to the cross members 187 over which the centers of the bottles have just traveled. The flights 5 continue their forward advance to the position 5*a* indicated in dotted outline, when the grid is in vertical registration or alignment with the flights and lower longitudinal guides 17, 167, 169, etc. and the bottles descend past the grid members or rails into the basket below and from thence are released into the case. When the bottles have dropped through the grid, lever 221 returns to its rearward position under the urging of spring pushed button 225, again closing contacts 129 and 133, so that solenoid 143 can be energized again by the right normal actuation of switch 111 to step or move the chain conveyor 3, for the next cycle of operation.

Figure 12:
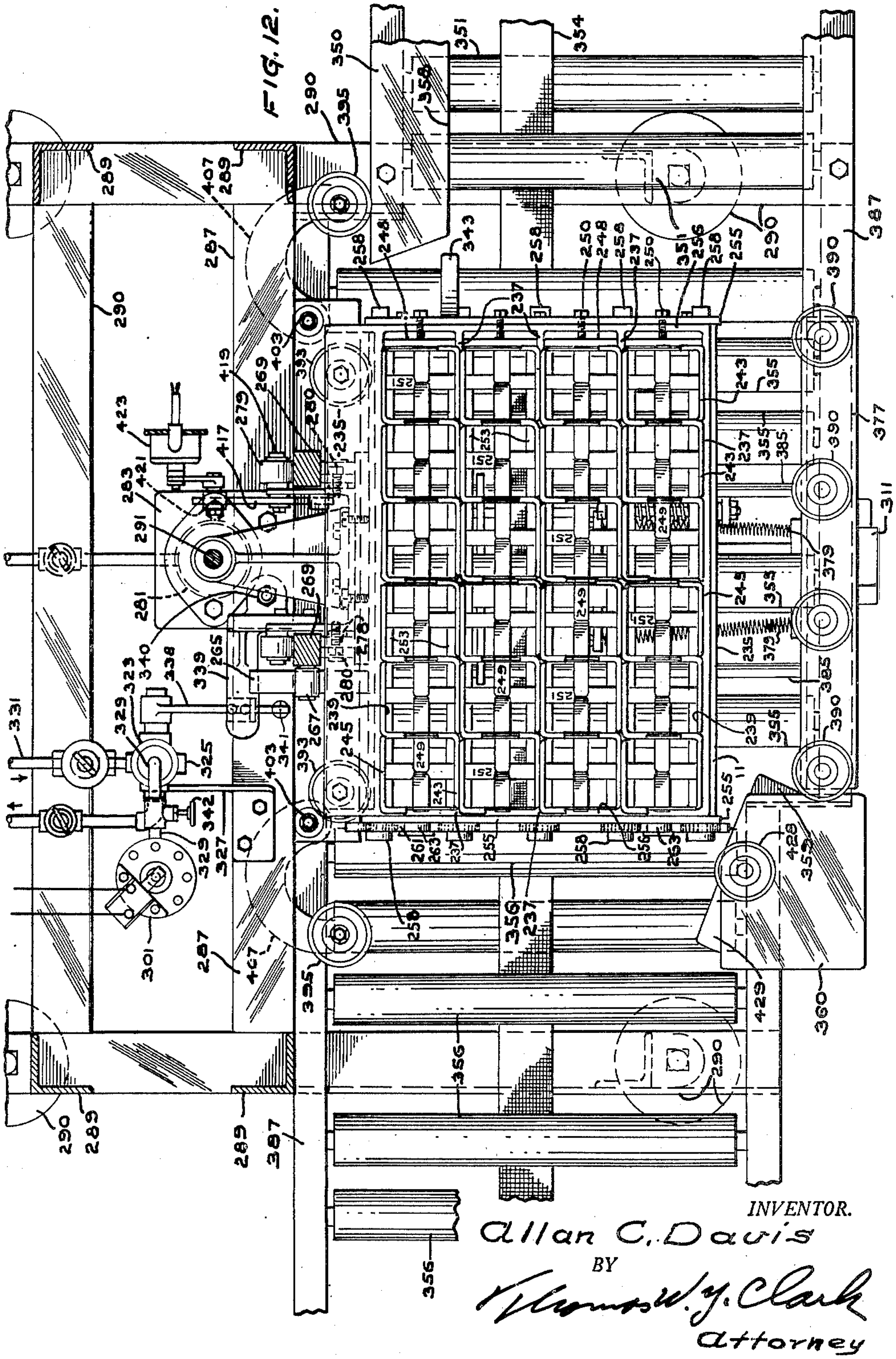
Figure 12 is partial horizontal sectional view taken below the grid illustrating the preferred form of basket or bottle receiving and depositing mechanism.
Figures 13, 14, 15, 16:
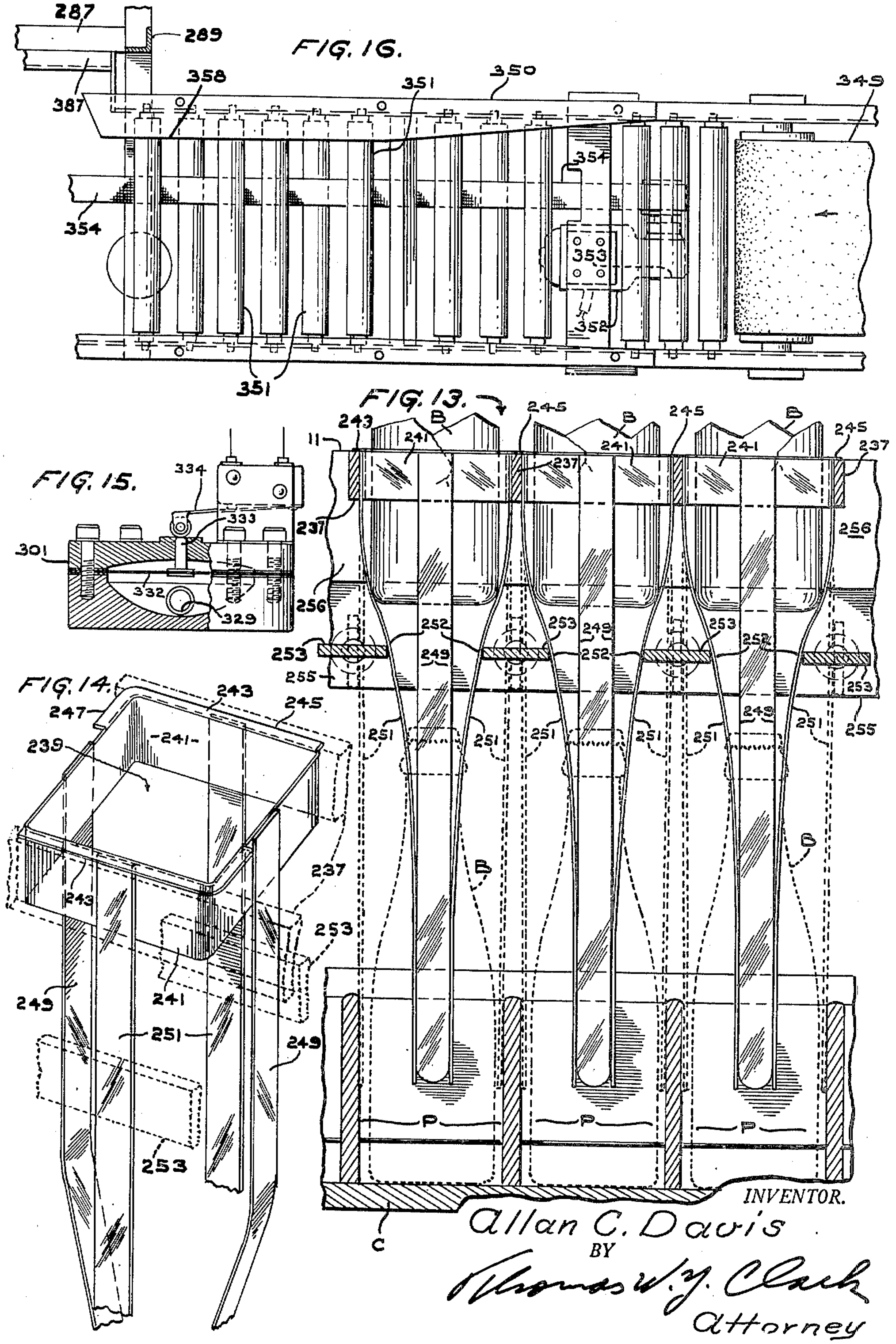
Figure 13 is an enlarged partial longitudinal sectional view illustrating a preferred means for holding or retaining the bottles in the basket.
Figure 14 is a partial view of the preferred form of a removable pocket for the basket.
Figure 15 is an enlarged elevational view partly in section of the pressure responsive switch associated with the basket control circuit.
Figure 16 is a plan view of the case conveyor on the right, feed in side of the machine.

The receptacle or basket 11 comprises a rectangular carriage 235 approximately the size of the container to be filled, in the present embodiment the twenty-four bottle case. Cross supports 237 extend from left to right across the basket and are spaced in accordance with the cells of the case to be filled and the openings 188 of the grid. As illustrated in Figures 12, 13 and 14, twenty-four pockets 239 are mounted in the carriage. Each pocket has a rectangular frame 241 with out-turned lips or flanges 243 at two diagonally opposite corners. These flanges extend the entire length of the frame on the forward and rear sides which engage the carriage 235 and cross supports 237, as indicated at 245, Figure 13. On the left and right edges each lip overhangs the side wall of the adjacent pocket for a portion of its length as indicated at 247, Figure 14. A clamp plate 248 is supported spaced from the right wall of the carriage and holds the pockets assembled, by screws 250. The pockets are readily removed and replaced from the top of the carriage as desired simply by loosening the screws 250.

Depending centrally from each of the sides of the frames 241 is an elongated resilient strip or finger. The left and right fingers 249 of each frame are normally bent inwardly toward each other at their lower ends and are shown as actually meeting below the center of the frame, Figures 8 and 12. The forward and rear depending fingers 251 are normally straight and are adapted to be bent or flexed inwardly to form a holding or flexed obstructing portion 252 in the pocket by means of rocking bars 253 as best seen in Figure 13. When the bars 253 are in their horizontal position the fingers hold the bottles dropped into the pockets from the grid by means of the bent portions 252. When the bars are rocked to their vertical position the obstructing portions of the fingers are gradually allowed to straighten and the bottles are then gradually released from the basket. In Figure 8 are shown side plates 255 which are fastened to the carriage left and right walls 256 by bolts 257 and which carry the rotatable bars 253 adjacent their lower edges. Collars 258 retain the bars 253 in the plates 255. On the left end of the bars 253 are attached pinions 259, Figure 8, which mesh above with a rack 261 maintained in position by flanged wheels 263 above the rack.

As seen in Figures 1 and 2, an arm 265 is fastened to the rear rocking bar 253 and contacts roller 267 in the upper position of carriage 235 in which position the rear bar 253 has been rocked to horizontal position. The rear pinion 259 has rotated moving rack 261 rearward to rock the other bars to the same position to hold the pockets 239 closed. As the carriage is slowly lowered on vertical tracks 269, the arm 265 strikes arm actuating plate 271 and the bars 253 are slowly rotated back to vertical position to gradually release the side pressure on the depending fingers 251 to open the pockets and release the bottle carried thereby. The arm actuating plate 271 is adjustable by means of slot 273 therein and bolt 275. In view of the arcuate movement of the finger flexing bars 253, moving from zero to maximum speed at the point of release for full opening of the fingers, together with the normally inwardly bent depending fingers 249, and the means to control the speed for lowering the carriage 235, to which the bar actuating arm 265 is attached—all produce a controlled cushioning effect to the releasing of the bottles.

The carriage 235 rides up and down on tracks 269 by means of lower rollers 277 mounted on the rear of the carriage and rolling on the forward surfaces of the tracks and upper rollers 279 on the rear surfaces of the tracks. The upper part of the cross-head portion of the carriage 235 is provided with bearing blocks 278, fastened to the carriage by screws 280, for bearing engagement with the front surfaces of the tracks 269. A cylinder 281 is mounted by means of collar plate 283 and cross brace 287 to front vertical braces 289 of framework 290 which supports frame 163 of the machine. Piston rod 291 engages bracket 293, Figures 2 and 8, which is fastened to the carriage 235.

Referring to Figure 20, it will be seen that solenoid 295 is energized to raise basket 11, by the admission of pressure to cylinder 281, from current supply conductor 119, conductors 149 and 147 to one terminal of the solenoid and from the other terminal through conductor 299, pressure responsive switch 301, conductor 303, conductor 305, contacts 307 and 317, conductors 137, 135, switch 131, conductors 127, 125, 123 and 117. Sustaining switch 319 then holds the solenoid 295 through conductors 299, 321, 305 and switch 311, to supply conductor 117 as before. Pressure responsive switch 301 for solenoid 295, shown in detail in Figure 15, is associated with a valve 323, Figures 1, 2 and 12, having exhaust outlet 325. The valve 323 is mounted by means of bracket 327 on cross brace 287, Figures 2 and 12. When pressure is admitted through pipe 329 to the switch 301 from air supply line 331, the diaphragm 332 and pin 333 thereon raise arm 334 to open the switch. Thus the sustaining circuit through switch 319 alone holds solenoid 295 actuated which, through linkage 335, maintains relief valve 336 of three-way valve 337 closed and cylinder 281 under pressure.

When a case has been positioned for the basket, as will be hereinafter described, center contact 307 of switch 311, lower left, Figure 20, closes with upper contact 317 and the sustaining circuit for switch 319 extends through contact 317, conductors 137, 135, contacts 133 and 129 of switch 131, conductors 127, 125, 123 and supply conductor 117. Therefore, when switch 131 is actuated to operate grid solenoid 213, and contacts 129 and 133 of switch 131 are opened by the impact of the moving bottle with the switch arm 221 the circuit is broken and solenoid 295 is deenergized, opening relief valve 336 and sustaining switch 319 and exhausting cylinder 281 to gradually lower the carriage 235 and basket 11.

As the carriage and basket lower, valve arm 338 is contacted by carriage bracket 339, rocking it downwardly against the action of spring 341 to open exhaust 325 of valve 323 to exhaust pressure responsive switch 301. An adjustable screw stop member 340 carried in a bracket on the cross-head portion of the carriage 235 is provided for the purpose of limiting the downward movement of the carriage. The stop screw 340 is positioned to have stopping impact with the cross-brace structure 287. When the pressure is sufficiently reduced by exhaustion of air through relief valve 342 and exhaust 325, switch 301 again closes permitting actuating of the solenoid 295 through conductors 299, 303, 305, contacts 307 and 317, conductors 137, 135, contacts 133 and 129 to supply conductor 117. The diaphragm switch 301 controls the length of dwell of the basket 11 in discharging its load into the case by means of control valve 342 because the carriage cannot be raised until switch 301 is closed, and valve 342 regulates the rate of exhaust.

The means for preventing the grid solenoid 213 from operating except when basket 11 is in raised position is seen in Figures 8 and 20. A leaf spring 343 is carried by side plate 255 on the right of the carriage 235. In its upper position spring 343 presses upon roller 345 to close switch 233 and shift the grid 7. A bracket member 347 fastened to the right side of grid 7 wedges between roller 345 and carriage spring 343 when the grid shifts and holds the switch 233 closed and the grid shifted until switch lever 221 of switch 131 slides off the neck of the descending sixth bottle and contacts 227 and 129 are opened. The grid is then shifted back to the left, opening switch 233 until the basket is again raised.

The conveyor for moving cases into position beneath basket 11 is illustrated in Figure 16 and comprises a belt conveyor 349 and a roller conveyor 350 having rollers 351 driven through a motor 352, reduction gearing 353 and belt 354. A table comprising the rollers 355 in the machine extends rearwardly further than the supply conveyor so as to extend in conveyor width to discharge rollers 356, offset rearwardly from the supply conveyor rollers 351. The case enters the machine as shown in dotted outline in Figure 17 guided by side rail 358 toward the front and striking plate 359 housed in case stop abutment 360, plate 359, closing switch 361, likewise housed in abutment 360, to actuate the case positioning mechanism. Cable 362 passing between abutment 360 and switch 311 is shown broken in Figure 17 to illustrate the leads therein. Referring to Figure 20, case pusher actuating solenoid 363 is energised by closing switch 361, closing exhaust valve 365 of three-way valve 367 to supply pressure to cylinder 369 mounted on support 370, pivoted in bracket 372 depending from front piece 387. Piston 371 is carried by U-shaped cross-head 373, which is connected by bars 375 to a front U-shaped cross-head 376 of the case pusher 377. Springs 379 are connected at one end to crosspiece 381 carried by the piston, and at the other to the cylinder support 370 and tend to hold the pusher in retracted position. Cross-head 373 is spaced from crosspiece 381 by tube 384 on piston rod 371.

The U-shaped members 373 and 376 are suspended slidingly on a pair of rods 385 extending between the front and rear frame pieces 387 of the roller conveyor 350. At the upper portion of the pusher is an angle 389 extending lengthwise of the conveyor 350, carrying four horizontally mounted rollers 390 which bear against the case, and form the pushing elements. The angle 389 is connected to the top of front U-shaped member 376. A bolt 391 in the angle 389 contacts button 392 of snap switch 311.

Figure 18:
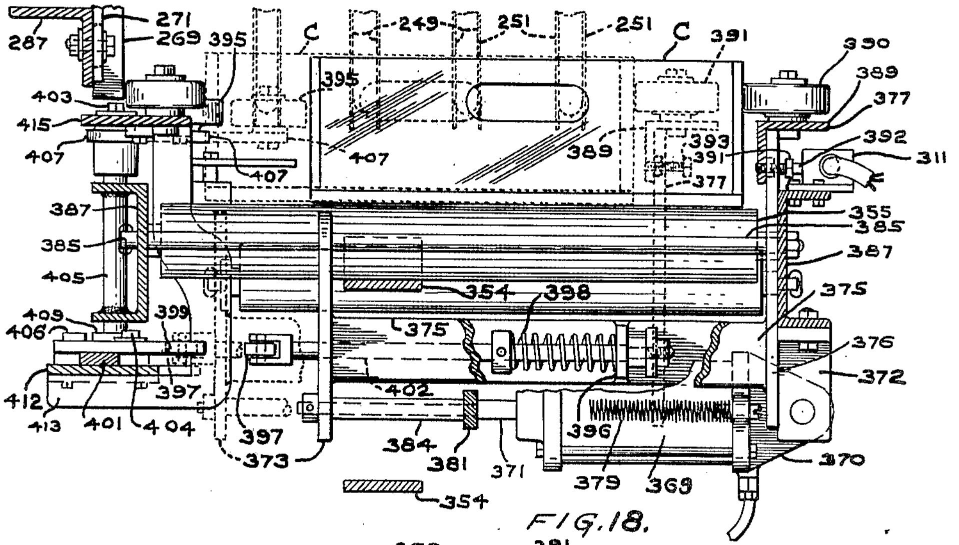
Figure 18 is a partial sectional view longitudinally of the machine and transverse to the case conveyor taken along the line 18—18 of Figure 17.
Figure 19:
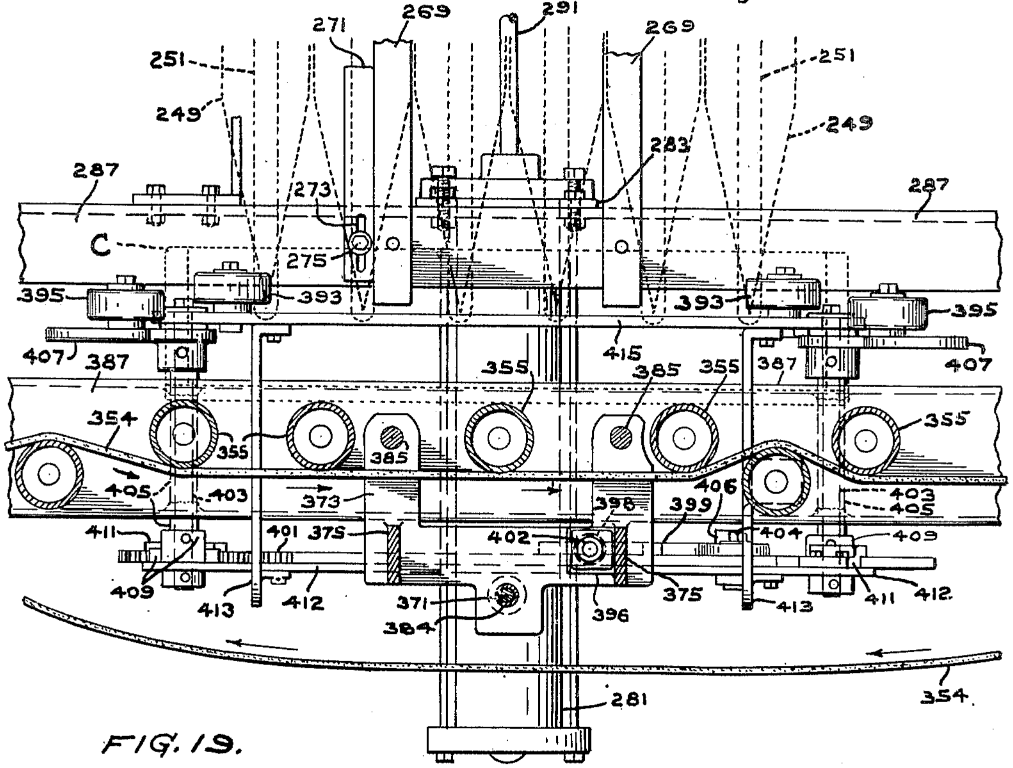
Figure 19 is a sectional view transverse of the machine taken along the line 19—19 of Figure 17.

To lock the case in bottle receiving position against the rear rollers 393 which act as a stop for the case pusher, case end grips comprising end rollers 395 mounted in C-shaped arms 407 are provided which rotate against the opposite ends of the case. These end roller arms are actuated by a yielding cam follower roller 397, Figures 17 and 18, mounted on rod 402 which slides in flange 396 on right hand bar 375 and crosshead 373. A spring 398 urges the rod 402 and roller 397 rearwardly and when the pusher 377 is moved to the rear, roller 397 rotates crank 399 to move end rollers 395 against the case ends. The crank 399 has a slot 400 acting on a pin 404 in rack 401 to move it lengthwise and close the end rollers on the case ends. The crank is pivotally engaged to its supporting structure by pin member 406. The shafts 403 on which the end roller arms are mounted have sleeves 405 which are welded to the rear frame piece 387 of the roller conveyor, Figure 18, and the shafts 403 carry at their lower ends segments of pinions 409 which mesh with the rack 401. Opposite the pinions 409 are brackets 411 to keep the rack in mesh therewith. The teeth of the rack are cut on opposite sides thereof at its opposite ends to produce the opposite rotation of the two shafts 403, Figures 17 and 19. The rack slides on a plate 412, Figures 18 and 19, supported by sleeve 405 and legs 413. The legs in turn are fastened at their upper ends to the rear roller support 415 also carried by sleeves 405 of the shafts 403. The rack thus insures equality of movement of the arms carrying the end rollers 395 to perfectly center the case, while spring 398 allows roller 397 to compensate for cases of varying length.

If, after the movement of a case is checked by abutment 360, the case pusher 377 is actuated by switch 361 and moves a case across the table 355, when the case strikes stop 393, the piston 371, cross-head 373 and pusher 377 hold the case tightly thereagainst. Side grips 395 not only center the case, but aid in preventing the case from being discharged prior to filling.

Figure 17:
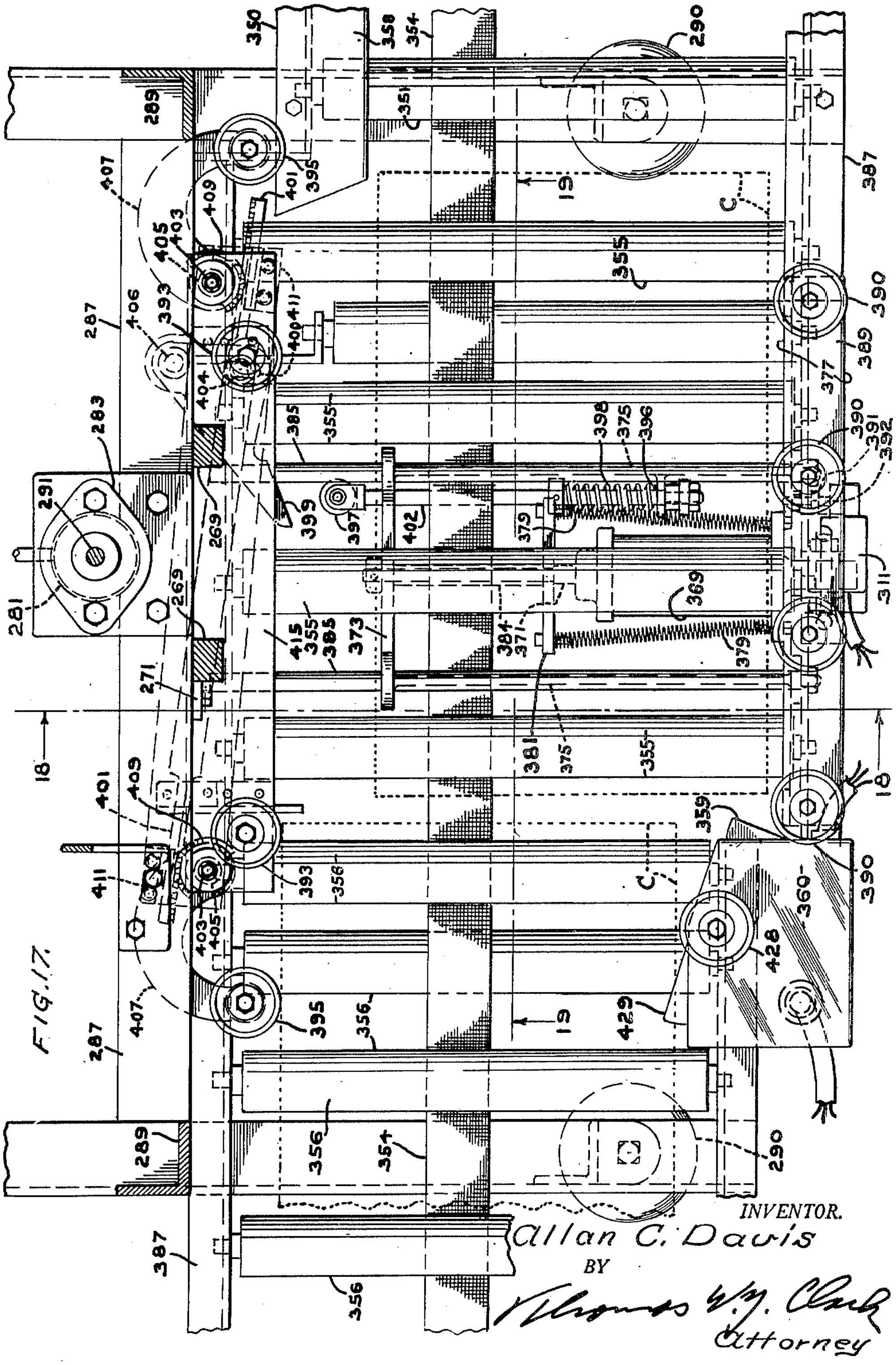
Figure 17 is a partial horizontal sectional view illustrating the case positioning mechanism.

As basket 11 is raised, as seen in Figures 1 and 12, lever 417 mounted on the carriage for clockwise rotation only on a pin 419 engages a follower or roller 421 and shifts it to the left to open switch 423, see also Figure 20. As seen in Figure 17, case abutting switch plate 359 is released as soon as the case is shifted rearwardly by the case pusher 377. The energizing circuit for the case pusher cylinder 369 is then opened and the sustaining circuit through sustaining switch 425, conductor 427, switch 423 and conductor 123 and supply conductor 117, only, maintains cylinder 369 actuated. As soon as the basket has raised sufficiently to actuate roller 421 to open switch 423, the case pusher is retracted under the action of springs 379 due to the deenergization of solenoid 363.

When spring urged roller 397 is thus retracted, crank 399 is free to return to its initial position. The case itself under the influence of the table rollers 355 of the roller conveyor 350 then moves the left end case positioning roller 395 out of its path of holding the case, moving the rack to the right, Figure 17, to rotate right end roller 395 to the right also. As the filled case passes onto discharge rollers 356, it contacts roller 428 and then depresses a second switch plate 429, opening switch 431 in the energizing circuit of solenoid 363. As soon as this switch is again closed indicating that the filled case has cleared left end roller 395 and an empty case contacts switch plate 359 closing switch 361, the solenoid 363 is again energized to actuate the case pusher cylinder 369.

If no case has moved into the machine to the filling position, and therefore the case pusher actuating switch plate 359 and its switch 361 have not been moved to closed position, the case pusher 389 remains in its normal position of rest, therefore the contacts 307 and 309 of case pusher switch 311 are held in closed position, contact 309 being directly in circuit with supply conductor 117 and contact 307 being in circuit with sustaining switch 319 and thence to solenoid 295 and directly to the other current supply conductor 119 through conductor 147, keeping the solenoid energized. Conversely, if a case has entered the machine and actuated the case pusher control switch 361, causing the case pusher to operate, the pusher bar or angle 389 moves away from the switch assembly 311 in its pushing operation, thereby breaking the circuit between the contacts 307 and 309, and then quickly closing the contacts 307 and 317. The circuit leading from contact 307 of course remains the same, but the circuit leading from contact 317 leads to the grid actuating switch 131 and thence to the supply conductor 117 by way of conductors 137, 135, 127, 125 and 123. In this changed circuit the carriage actuating solenoid 295 is also kept energized. The pusher actuated switch 311 is of the snap switch type whereby the changeover will be quick and the carriage actuating solenoid 295 will be maintained in a substantially constant state of energization, for the purpose of keeping the three-way valve 337 open and the carriage raising cylinder 281 under constant air pressure to maintain the carriage in constant elevated position, and thereby keep the sustaining switch 319 closed until the actuation of bottle controlled switch 131, for shifting the grid 7, takes place, at which time the solenoid 295 is properly deenergized, for lowering the bottle filled carriage. The quick action of the pusher actuated snap switch 311 in the changeover from one circuit to another is so fast as to maintain sufficient magnetic flux in solenoid 295 to keep the armature raised and valve linkage 335 held in raised position, and therefore to hold the sustaining switch 319 in closed position.

Figures 21 through 26 illustrate a modification of the bottle receiving pockets wherein membranes 433 are inflated to form obstructing members or obstructions 434 to hold the bottles as they are dropped into the basket pocket from the supporting grid 7. The frame and carriage guiding and moving mechanisms are the same as in Figure 12, and the same reference numerals have been applied to the like parts. The arm 435 which is similar to arm 338 of Figure 12 is contacted by bracket 437 on the carriage rocking the arm downwardly against the action of spring 439 to open exhaust 441 of valve 442 similar to valve 323. The pressure, however, is not only exhausted from the diaphragm switch 443, similar to diaphragm switch 301, but also from the inflated membranes 433 through flexible hose 445 and pipe 447 to release the bottles into the case. If desirable the deflation period for the membranes 433 may be controlled through the use of membrane exhaust control valve 448 in pipe line 447 whereby the period of deflation may be prolonged to slowly release the bottles into the case. Diaphragm switch 443 controls the dwell of the basket at its lowermost bottle discharge position as in the previous embodiment, with switch 301. In this respect the time period for exhausting the air from the diaphragm switch 443 may be controlled by the use of the diaphragm control switch valve 450 in the combined pressure and exhaust line leading from the switch member 443, thereby controlling the period of dwell of the carriage and basket as in the first embodiment.

Figures 22, 23:
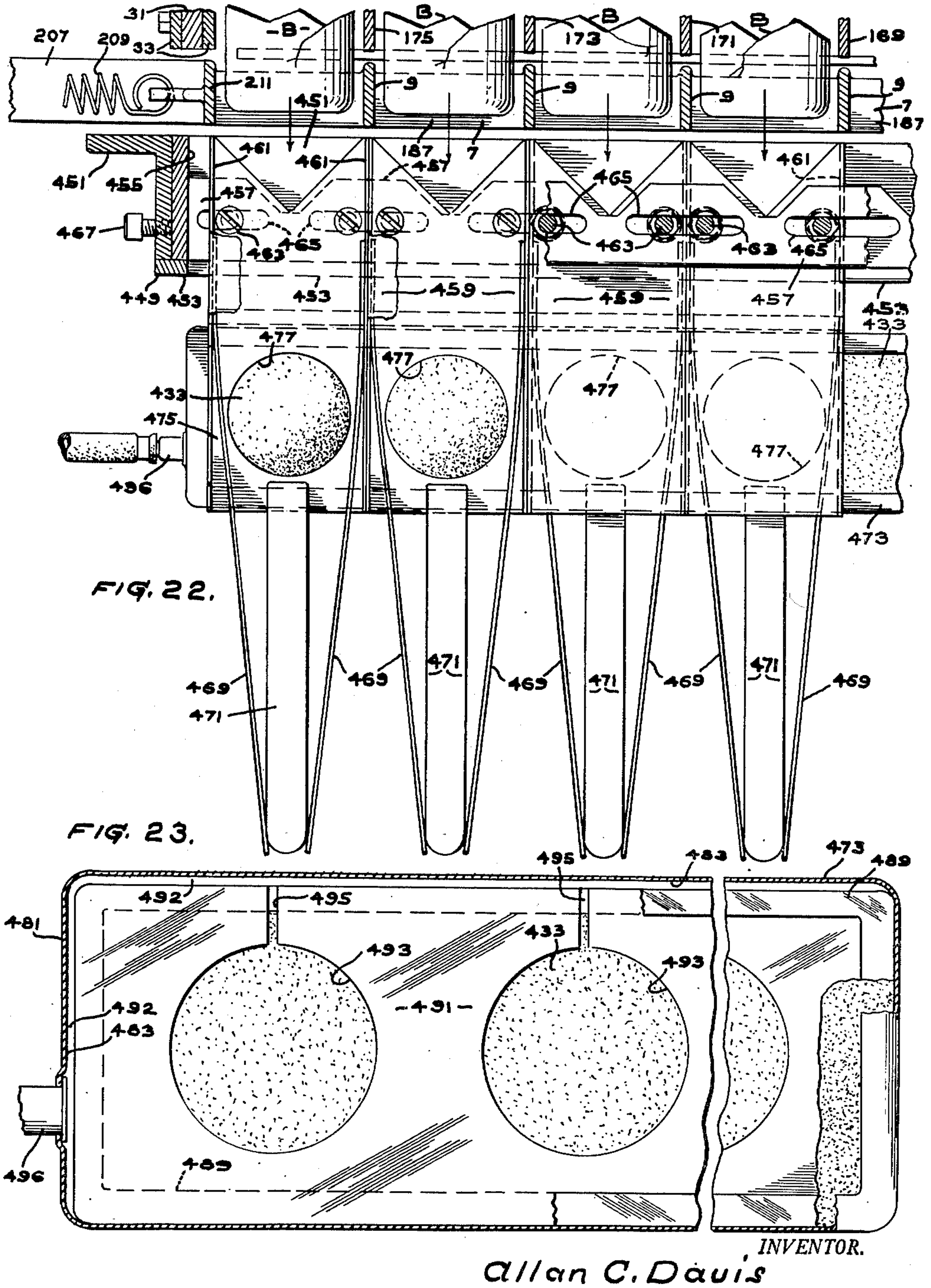
Figure 22 is a partial transverse sectional view of the modified form of Figure 21 with the grid and conveyor shifted to bottle dropping position.
Figure 23 is a fragmentary elevational view of a bottle retaining member of the modification of Figure 21, with portions thereof broken away.
Figures 24, 25, 26:
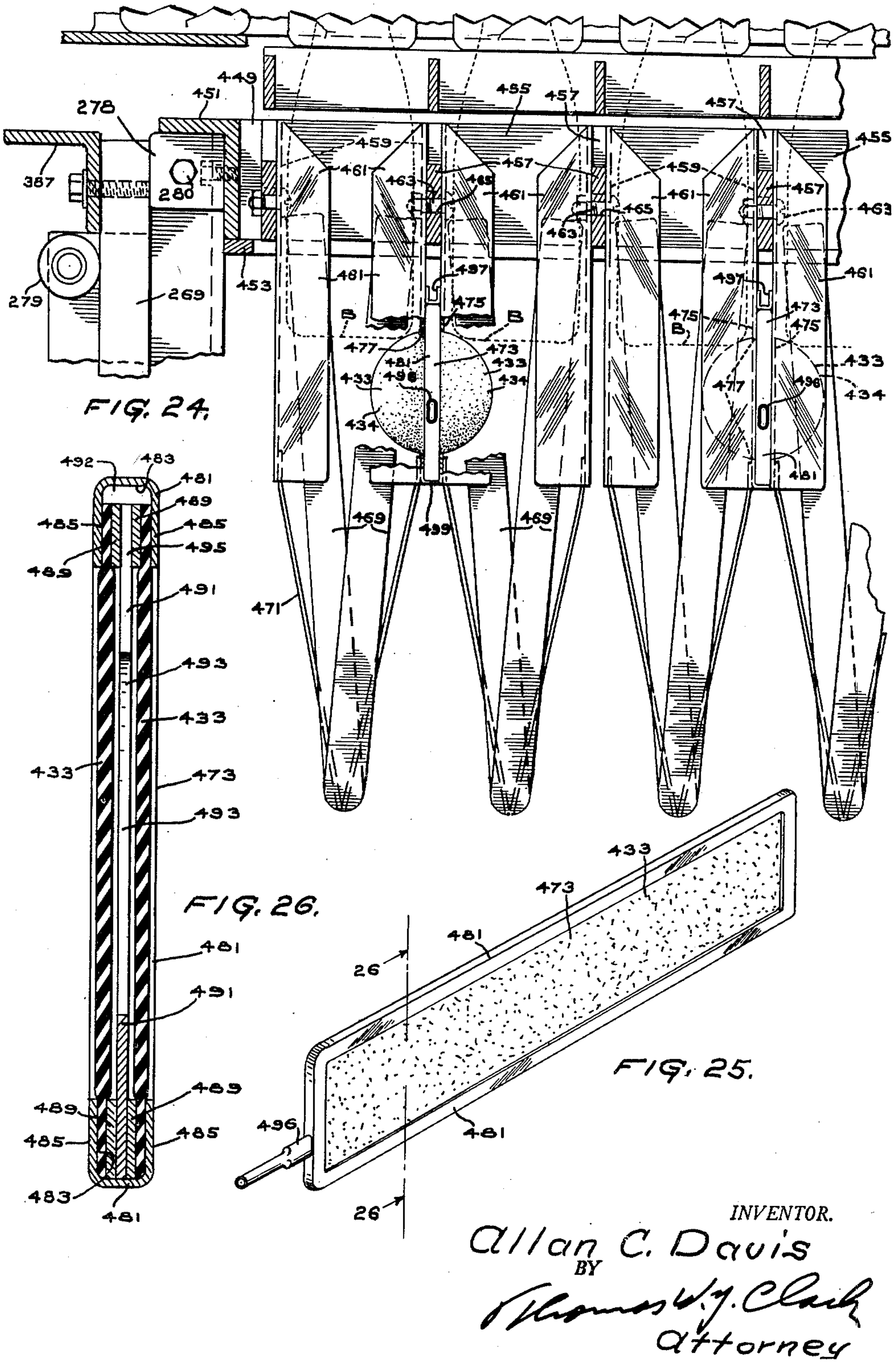
Figure 24 is a partial longitudinal sectional view, partly broken away, of the mechanism of Figure 21.
Figure 25 is a perspective exterior view of the retaining member shown in Figure 23.
Figure 26 is a cross-sectional view on the line 26—26 of Figure 25.
Figures 27, 28, 29, 30:
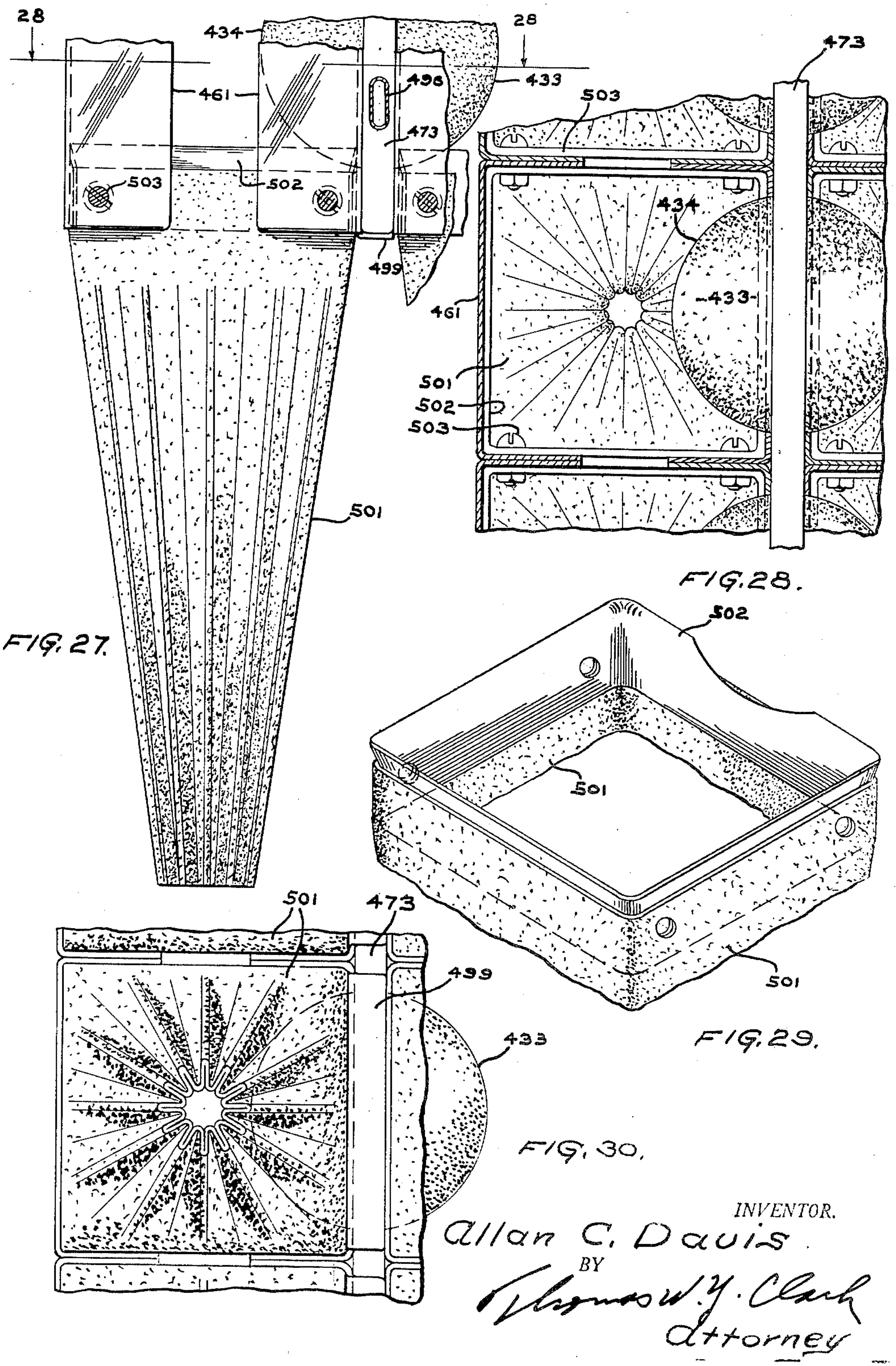
Figure 27 is a partial longitudinal sectional view of a further modification of a pocket for the depositing mechanism or basket of Figure 21.
Figure 28 is a partial horizontal sectional view of this last modification, taken on the line 28—28 of Figure 27.
Figure 29 is a partial perspective view of the frame of the pleated rubber guide of Figure 27.
Figure 30 is a partial inverted plan view of the pocket of Figure 27.

As seen in Figures 22 and 24, the grid assembly is identical to that previously described and has been given the same reference numerals. The carriage 449 comprises a Z-sectioned member 451 on three sides. Supported on the side lower flanges 453 of member 451 are longitudinal bars 455 having connected thereto cross supports 457 spaced in accordance with the containers to be filled. The pockets or pens 459 have a pair of U-shaped frames 461, each forming two adjacent corners of the pen and the frames are fastened by means of bolts 463 through slots 465 of one of the cross supports 457. In this way bars 455, cross supports 457 and the pockets are removable by simply loosening set screws 467 of member 451.

Spring fingers are mounted on the sides of the pocket frames. Left and right fingers 469 extend upwardly to near the top of the pocket and are attached to diagonally opposite edges of the frames 461, and slope downwardly toward the center of the pocket, while the front and rear fingers 471 are fastened at the bottom center of frame 461, by this construction the two frames 461 of each pocket are identical, and are interchangeable.

The inflatable bottle stop assemblies 473 are inserted between the two front rows of pockets and the two rear rows adjacent the pocket sides 475 formed by the frames 461. The frames 461 comprising the sides 575 have circular holes 477 cut therein permitting the expansion of the bottle-stop membranes 433 into the pen to obstruct the passage of bottles through the pockets.

As seen in Figure 26, each of the bottle stop assemblies 473 comprises a rectangular frame 481 providing a rectangular channel 483 having side walls 485. A pair of transversely spaced rubber membranes 433 are clamped in channel 483 between central spacers 489 and side walls 485. A central partition 491 within the frame maintains outward pressure against spacers 489.

The central partition 491 and the central spacers 489 do not extend for the entire height or length of frame 481 and thereby they leave an air passage 492 along one side and the top of the frame 481 as shown particularly in Figure 23. Communicating with this passage 492 are slots 495, leading to circular openings 493 in the central partition 491. Air is supplied to nipple 496 through channel passage 492, slots 495 and openings 493 to expand the membranes 433 through circular openings 477 of the pockets 459.

An upper U-sectioned guide 497 is carried by the frames 461 of sides 475 and a lower guide 499 is formed by turning in a bottom edge of one frame 461 forming one side 475, to form a holder for the bottle stop assemblies.

A third modification of the pockets for basket 11 is illustrated in Figures 27, 28, 29 and 30. Here the modified bottle stop assembly of Figure 21 is again employed but an expansible inverted frusto-conical shaped rubber tube 501 is substituted for the spring fingers. The pocket frames 461 are similar to those of Figure 21 but receive at their lower edges the metal top 502 holding around it the tube 501 which is vulcanized or cemented thereto. Bolts 503 hold the tube 501 and top 502 to the frame 461. The tube 501 is molded in its constricted form so that after it unfolds to pass a bottle through it, it again resumes its constricted position.

The construction and operation of the improvements which constitute the invention having been fully described, it will be apparent that many modifications and changes may be made without departing from the invention as defined in the following claims.

What is claimed as new and is desired to be secured by Letters Patent is:

1. A machine for packing similar articles comprising a plurality of horizontal parallel laterally movable spaced rails, spaced stationary guides above and parallel to said rails on each side of the rails, spaced means extending over said rails to feed similarly shaped articles onto said rails and between said guides, said guides being positioned relative to the rails with one substantially nearer the intermediate rail than the other to position the articles on the rails substantially to one side of their vertical centers to tilt the articles against the guide furthest from the rail, a partitioned receptacle immediately beneath said rails, the partitions of the receptacles registering vertically with certain of the guides, means to move the rails laterally toward the nearest guides to be vertically beneath the guides registering with the partitions so as to drop the articles from the rails into the receptacle.

2. A machine for packing similar articles comprising means for advancing a row of similarly shaped articles, means for collecting the articles from the advancing means and arranging them into columns comprising a plurality of horizontal parallel rails, stationary guides above and parallel to said rails, on each side of the rails, a conveyor comprising elongated flights having ends, a chain supporting each of the elongated flights at one end thereof opposite the advancing means, the flights laterally extending open endedly over said rails to feed the articles from said advancing means onto the rails and between the guides, the conveyor successively sweeping groups of articles, each group corresponding to the number of rails, from the advancing means and placing one of each group on each rail, the flights maintaining the successive articles on each rail spaced, a receptacle beneath said rails, means to move certain of the guides and rails into vertical register to drop the articles from the rails into the receptacle.

3. The machine of claim 2 including means to move the conveyor step-by-step and means to actuate the conveyor moving means only when a complete group of articles has been advanced by the row advancing means.

4. In a machine for packing similar articles in cell cases, a charge collecting mechanism for forming a plurality of columns of similarly shaped articles in rows and comprising a plurality of horizontal elongated strips spaced apart the width of the articles to be packed and fixed in parallel relation to one another for separating and guiding the columns of articles as they pass into said mechanism, means mounted between said strips subdividing the elongated spaces between each pair of adjacent strips to support the articles in the collecting mechanism, means to move the strips and supporting means relatively to each other to drop the articles therebetween, a downwardly movable receptacle below said mechanism to receive the articles therefrom, and means in the receptacle to retain the articles therein, said last-named means being operable to non-retaining position during downward movement of said receptacle to release articles therethrough.

5. In a machine for packing similar articles, means delivering similarly shaped articles to the machine in a column, supporting means receiving said articles from said delivering means, an endless conveyor having elongated flights with ends, means mounting the conveyor flights at a single end, opposite the delivery means to laterally extend the flights above and across the supporting means to receive the articles between adjacent flights in successive groups to form rows, said conveyor moving the successive rows of articles across the supporting means transversely to the delivering means by step-by-step movements, and parallel guides between the supporting means and flights extending in the direction of conveyor movement, to divide the rows into a plurality of columns of spaced articles on the supporting means.

6. In a machine for packing similar articles, means delivering similarly shaped articles to the machine in a column, supporting means receiving said articles from said delivering means, an endless conveyor having multiple flights with ends, means mounting the conveyor to extend the flights above and across the supporting means to receive the articles between adjacent flights in successive groups to form rows, said conveyor moving in successive rows of articles across the supporting means transversely to the delivering means by step-by-step movements, said conveyor comprising an endless chain having the flights attached by one end thereof and projecting laterally from one side thereof toward the delivery means, forming open ended compartments between adjacent flights.

7. In a machine for packing similar articles, means delivering similarly shaped articles to the machine, a stationary stage for supporting a row of articles received from the delivering means, a conveyor comprising an endless chain having projecting from one side thereof a plurality of spaced bars, successive bars defining compartments, means for mounting said conveyor to extend the compartments longitudinally over said stage with the bar free ends toward the delivery means to receive on the stage successive rows of articles upright and side by side from said delivering means, means for advancing said conveyor to register successive compartments with said delivering means and to slide articles in said conveyor over said stage, and guides mounted to extend over said stage, said guides successively contacting articles of a compartment to separate them into rows transverse to the compartments.

8. In a machine for packing similar articles, means delivering similarly shaped articles to the machine, a stationary stage for supporting a row of articles received from the delivering means, a conveyor comprising an endless chain having a plurality of spaced bars projecting laterally from one side thereof, successive bars defining compartments, means for mounting said conveyor to extend the compartments longitudinally over said stage to receive thereon successive rows of articles upright and side by side from said delivering means, means for advancing said conveyor to register successive compartments with said delivering means and to slide articles in said conveyor over said stage and removable means for supporting said articles in said conveyor forward of said stage, and means to remove said supporting means to substantially simultaneously empty a plurality of compartments of said conveyor to form a charge for a cell case.

9. In a machine for packing similar articles, means delivering similarly shaped articles to the machine, a stationary stage for supporting articles received from the delivering means, a conveyor comprising a plurality of spaced bars supported at a single end and extending laterally, successive bars defining open ended compartments, means for mounting said conveyor to extend the compartments longitudinally over said stage to receive thereon successive rows of articles upright and side by side from said delivering means, means for advancing said conveyor to register successive compartments with said delivering means and to slide articles in said conveyor over said stage, and guides mounted to extend over said stage, said guides successively contacting articles of a compartment to separate them into rows transverse to the compartments, rails between said guides to support the articles in the conveyor forward of the stage, a plurality of parallel cross members between the rails, parallel with and spaced equally with the conveyor bars, forming with the rails a grid, the top of the cross members being below the top of the rails, and means to move the grid sidewise to register the rails vertically with said guides, whereby articles may fall between the guides.

10. In a machine for packing similar articles, means delivering similarly shaped articles to the machine, a stationary stage for supporting articles received from the delivering means, a conveyor comprising a plurality of spaced bars, successive bars defining compartments for receiving articles upright and side by side, means for mounting said conveyor to pass over said stage to receive articles from said delivering means, the compartments successively receiving a group of articles from the delivering means, means for advancing said conveyor to register successive compartments with said delivering means, and to slide articles in said conveyor over said stage, and guides mounted to extend over said stage, said guides successively contacting articles of a compartment to separate them, and rails between said guides to support the articles in the conveyor forward of the stage, a plurality of parallel cross members between the rails, parallel with and spaced equally with the conveyor bars, forming with the rails a grid, the top of the cross members being below the top of the rails, and means to move the grid sidewise to register the rails vertically with said guides, whereby articles may fall between the guides, means to actuate the grid moving means prior to the vertical registration of the conveyor bars with the cross members of the grid, to drop the articles first to the grid cross members and then through the grid upon further movement of the conveyor.

11. A machine for packing similar articles comprising a plurality of horizontal parallel rails joined together to form a grid, stationary guides above and parallel to said rails on each side of the rails, spaced means extending over said rails to feed similarly shaped articles onto said rails and between said guides, said guides being positioned relative to the rails with one substantially nearer the intermediate rail than the other to position the articles on the rails substantially to one side of their vertical centers to tilt the articles against the guide furthest from the rails, means to support said grid for lateral movement to move each rail toward the nearest guide to register the rails and guides, whereby articles on the rails may pass downwardly between the guides.

12. A machine for packing similar articles comprising a plurality of horizontal parallel rails joined together to form a grid, stationary guides above and parallel to said rails on each side of the rails, spaced means to feed similarly shaped articles onto said rails and between said guides, means to support said grid for lateral movement to register the rails and guides, whereby articles on the rails may pass downwardly between the guides, cross members in said grid between the rails with their tops below the rail tops, said cross members being spaced equally with the spaced feeding means, means to move the grid laterally prior to the vertical registration of the feeding means and cross members to drop articles first to the cross members and then through the grid upon further movement of the feeding means.

13. In an article packing machine, means for delivering articles to the machine, a mechanism for arranging the articles in compact rows, means for advancing the rows through the machine transversely to the rows, each row being separate from the others in said advancing means, means for spreading the articles of each row to correspond to the spacing of the cells of a case as the rows are advanced, a grid for supporting simultaneously a plurality of rows and having openings corresponding to the cells of a case, cross members of the grid spaced to correspond to the spacing between the rows of articles, longitudinal members of the grid extending above the cross members to support the articles, said advancing means moving the articles onto the grid longitudinal members, over the cross members, and means for relatively shifting the articles and the grid to register the openings in the grid and the articles to drop the articles through the grid openings.

14. In an article packing machine for delivering a charge of similarly shaped articles to a cell case, a charge collecting device comprising longitudinal elongated grid members and transverse grid members extending at right angles thereto, the longitudinal and transverse members being connected together to provide spaced openings corresponding to the cells in a case, said longitudinal grid members projecting above said transverse members to provide rails on which to slide the articles onto the device.

15. In a machine for packing similar articles, means to feed similarly shaped articles, means advancing the articles from the feeding means in a plurality of columns, an article collecting means to receive the columns of articles from said advancing means to form a charge for a case, a receptacle beneath said article collecting means, means for supporting a case below said receptacle, means to hold articles in said article collecting means, and means to operate said holding means to drop a charge of articles into the receptacle, means for retaining the articles in said receptacle, and means for operating said retaining means to drop the articles into the case.

16. The machine of claim 15 in which the means to operate the holding means to drop a charge of articles into the receptacle are actuated by the movement of a full charge of articles into the article collecting means.

17. In a machine for packing similar articles, means to feed similarly shaped articles, means for advancing articles from the feed means in a plurality of columns, means for collecting a plurality of columns of articles from the advancing means to form a charge for a case, a vertically reciprocating receptacle below said collecting means, means to release a charge from the collecting means into the receptacle, means for supporting a case below said receptacle to receive the charge therefrom and means for moving said charged receptacle downwardly and to deposit the charge from said collecting means into the case.

18. The machine of claim 17 including means to hold the charge in the receptacle and to operate the holding means to deposit the charge into the case.

19. In a machine for packing similar articles, means to feed similarly shaped articles, means for advancing articles from the feed means in a plurality of parallel columns, a plurality of horizontal spaced parallel shiftable rails to receive the articles from said columns to form a charge, guides above said rails to receive articles therebetween from said advancing means and maintain them in substantially upright position above said rails, means for shifting said rails to release a charge, a receptacle beneath said rails for receiving the charge therefrom when the rails are shifted, means for supporting a case below said receptacle, to receive a charge from the receptacle, means for moving said receptacle from an upper article-receiving position to a lower article-depositing position adjacent the case, and means for preventing the shifting of said rails when said receptacle is in the lower article-depositing position.

20. In a machine for packing similar articles, means for advancing similarly shaped articles in a plurality of parallel columns, a plurality of spaced parallel shiftable rails on which to receive the articles from said columns to form a charge, a vertically movable receptacle beneath said rails, means for supporting a case below said receptacle, guides above said rails adapted to receive articles therebetween from said advancing means and to maintain them in upright position above said rails, means for shifting said rails, said receptacle receiving the articles from between the guides when the rails are shifted in the upper position of the receptacle, means to lower the receptacle and to discharge the articles into the case, means carried by the receptacle to prevent actuation of said rail shifting means when the receptacle is in article discharging position.

21. A case loading machine comprising in combination a machine framework, a conveyor for advancing a plurality of rows of articles in said framework, an article-holding basket supported by said framework beneath the conveyor, means to release rows of articles from said conveyor downwardly into said basket, said basket being movable between article receiving position and article discharge position, means to retain articles in said basket, and means actuated by the articles to move the filled basket to article discharge position.

22. A case loading machine comprising in combination a machine framework, a conveyor for advancing a charge of articles in said framework, an article-holding basket supported by said framework receiving the charge of articles from said conveyor and movable between article receiving position and article discharge position, means to retain articles in said basket, means actuated by the articles to move the filled basket to article discharge position and means actuated by the movement of said basket to drop the articles through the basket when the basket reaches article discharge position.

23. A case loading machine comprising in combination a machine framework, a conveyor for advancing a charge of articles in said framework, an article-holding basket supported by said framework receiving the charge of articles from said conveyor and movable between article receiving position and article discharge position, means to retain articles in said basket, means actuated by the articles to move the filled basket to article discharge position, said conveyor exerting a pressure on the articles to operate the means moving the basket to discharge position.

24. A case loading machine comprising in combination a machine framework, a grid supported by said framework having a plurality of horizontal supporting dumping rails, an article holding basket beneath the rails mounted for vertical reciprocation in said framework, a conveyor to advance articles in a plurality of columns to said grid on the said rails, means to distribute the articles on the rails, an electrical switch operated by the articles, means controlled by said switch to actuate the rails to drop the articles into said basket, means to lower said basket and means to release the articles through the basket at the lower position thereof.

25. A case loading machine comprising in combination a machine framework, means to feed empty cases into the framework, an article-holding basket positioned above a case in the framework, means in the basket to separately retain therein a plurality of articles in a plurality of rows, means to load as a formed charge a plurality of articles in a plurality of rows into said basket, means mounting the basket for vertical reciprocation in the framework and means to release the articles as a formed charged through the basket when the basket is lowered to article discharge position adjacent a case.

26. In a device of the class described, the combination of a charge collecting device grouping articles into a formed charge, a depositing mechanism receiving successive charges from said charge collecting device and mounted for movement between charge receiving position and charge releasing position, obstructing members for retaining said articles in said depositing mechanism, means to transfer a charge from the charge collecting device to the depositing mechanism, means retaining said obstructing members in operative position, means for releasing said retaining means when said depositing mechanism has substantially reached charge releasing position, and means mounting a receiver into which the charge is deposited upon release from said depositing mechanism.

27. In an article packing machine for filling a cell case with a charge of articles, a charge depositing mechanism and means for delivering a charge of articles in a single group to said mechanism, said mechanism comprising a carriage movable vertically reciprocably between charge receiving and charge releasing position, and a plurality of pockets in the carriage corresponding to at least one row of the cells of the case, an obstruction for each pocket to retain an article therein, means for removing said obstructions to the passage of articles through the pockets to release articles from the pockets, and means for guiding the movement of said carriage from charge receiving to charge releasing position.

28. In a case loading machine for filling a case with a charge of articles, a charge collecting device for gathering and releasing a charge of articles, a vertically moving charge depositing mechanism for receiving a charge from said collecting device in an upper position and descending to a lower position to deposit the charge in a case, electric means for actuating said collecting device to release a charge, a switch in the actuating circuit of said electric means, means controlled by said depositing mechanism to operate the switch to close the circuit in upper position, said operating means releasing as the depositing mechanism is lowered to open the circuit, and means controlled by the release of said collecting device to hold the switch operated after said depositing means has descended to insure continued actuation of said electric means as the depositing means descends.

29. In a case loading machine, a case positioning mechanism and means for feeding cases to said mechanism, said mechanism comprising a table for receiving cases from said feeding means, and a case pusher actuated by a case fed thereon, a stop opposite said pusher, said pusher moving across said table to slide a case against said stop means for centering said case on said table operable with said case pusher.

30. In a case loading machine, a case positioning mechanism and means for feeding cases to said mechanism, said mechanism comprising a table for receiving cases from said feeding means, and a case pusher actuated by a case fed thereon, a stop opposite said pusher, said pusher moving across said table to slide a case against said stop, means for centering said case on said table operable with said case pusher, and said table comprising a continuation of said feeding means and being actuated to continue moving said case, said centering means and pusher locking the case against movement, and means releasing said centering means and said pusher when a case is filled.

31. In a packing machine for placing articles in a cell case, a positioning mechanism for holding cases in filling relation to said machine comprising a continuously operating conveyor leading into and leaving the machine, a stop abutment adjacent the case filling position in the path of cases fed into the machine on said conveyor, a movable pusher adjacent said abutment for shifting a case resting against said abutment transversely of the conveyor, means for actuating said pusher when a case strikes said abutment, said pusher shifting said case to clear said abutment whereby it is moved to filling position and may be moved out of the machine by said conveyor.

32. In a case loading machine, a case positioning mechanism and longitudinally extending means to feed a case to said mechanism, said mechanism comprising a table for receiving cases from said feeding means, and means at each end of the table contacting both ends of the case to center the case lengthwise of the feed means on the table, said contacting means including yieldable means to center cases of varying lengths.

33. In an article packing machine for filling a cell case with a charge of articles, a charge depositing mechanism and means for delivering a charge to said mechanism, said mechanism comprising a carriage movable between charge receiving and charge release position, and a plurality of pockets in the carriage to correspond to the cells of a case, pneumatically operated means in each pocket to retain an article therein, and means to release said pneumatically operated means, to release articles from said pockets, and means for guiding the movement of said carriage from charge receiving to charge release position.

34. In an article packing machine for filling a cell case with a charge of articles, a charge depositing mechanism and means for delivering a charge to said mechanism, said mechanism comprising a carriage movable from upper charge receiving to lower charge release position, and a plurality of pockets in the carriage to correspond to the cells of a case, pneumatically operated means in each pocket to retain an article therein, and means to release said pneumatically operated means, to release articles from said pockets, and means to operate said pneumatically operated means, to set the same to retain articles in the upper carriage position, and to release the same in lower carriage position, and means for guiding the movement of said carriage from charge receiving to charge release position.

35. In an article packing machine for filling a cell case with a charge of articles, a charge depositing mechanism and means for delivering a charge of articles in a single group to said mechanism, said mechanism comprising a carriage movable between charge receiving and charge release position, and a plurality of individually separate pockets in the carriage arranged in a plurality of rows to correspond to the cells of a case, inflatable means in each pocket, means to admit pressure to each said inflatable means to retain articles in the pockets, and means to release the pressure in the inflatable means to release articles from the pockets and means for guiding the movement of said carriage from charge receiving to charge release position.

36. A movable carriage for a charge of articles, to hold the same and deliver them to a cell case, a plurality of individually separate pockets in the carriage arranged in a plurality of rows corresponding to the cells of a case, inflatable means in each pocket, means to admit pressure to each said inflatable means to retain articles in the pockets, and means actuated by the movement of the carriage to release the pressure in the inflatable means to release articles from the pockets.

37. A carriage for a charge of articles, to hold the articles and release them therefrom, partitions in the carriage, dividing the carriage into a plurality of pockets, the partitions having openings therein connected with each pocket, inflatable means between the opening containing partitions between each two rows of pockets, means to admit pressure to each said inflatable means to extend them through said openings into each pocket to retain articles in the pockets, and means to release the pressure in the inflatable means to release articles from the pockets.

38. A carriage for a charge of articles to hold the articles and release them therefrom, frames in the carriage, dividing the carriage into a plurality of rows of pockets, the frames being spaced apart in one direction between adjacent rows, removable partitions between said spaced frames, guides in said carriage for said partitions, inflatable means in said partitions, projecting into each pocket, means to admit pressure to each said inflatable means to retain articles in the pockets, and means to release the pressure in the inflatable means to release articles from the pockets.

39. A carriage for a charge of articles, to hold the articles and release them therefrom, frames in the carriage, dividing the carriage into a plurality of rows of pockets, the frames being spaced apart in one direction between adjacent rows, partitions between said spaced frames having a passage therethrough, inflatable means on both sides of said partitions, projecting from each side into each of the pockets on the adjacent side of said partitions, means to admit pressure to each said inflatable means through said passage to retain articles in the pockets, and means to release the pressure in the inflatable means to release articles from the pockets.

40. In an article packing machine for filling a cell case with a charge of articles, a charge depositing mechanism having a plurality of pockets therein means extending from their sides to hold articles in each pocket and to release them therethrough and means for guiding articles vertically through said depositing mechanism to a case comprising an open resilient hose in each pocket attached at its upper periphery to the edges of the pocket, the lower end of each hose being resiliently constricted to restrain an article passing therethrough, said constricted end expanding upon the release of an article through the pocket to a case and then again contracting.

41. In an article packing machine for filling a cell case with a charge of articles, a charge depositing mechanism having a plurality of pockets therein and means for guiding articles vertically through said depositing mechanism to a case comprising an open resilient hose in each pocket attached at its upper periphery to the edges of the pocket, the lower end of each hose being resiliently vertically fluted to restrain and centralize an article passing therethrough, the flutes expanding upon the release of an article through the pocket to a case and then again contracting.

42. A machine for packing similar articles comprising a plurality of spaced stationary horizontal and parallel guides, means to feed articles between said guides, a plurality of articles supporting rails beneath and parallel to said guides, said rails being spaced apart to provide one rail between two adjacent guides, each of said rails normally being positioned horizontally closer to one of the two adjacent guides than to the other adjacent guides to thereby cause an article standing on a rail to lean toward the furthest away of its two adjacent guides, means to support an article receiving receptacle beneath said rails, and means to move each of said rails into vertical alignment with one of the two adjacent guides to drop articles from the rails into said receptacle.

43. A machine of the character described in claim 42 wherein said supporting rails are connected by transversely extending cross-members parallel to each other, said cross-members having their upper edges positioned below the upper edges of said supporting rails.

References Cited in the file of this patent

UNITED STATES PATENTS

| | | |
|---|---|---|
| 859,772 | Hoyt | July 9, 1907 |
| 1,243,407 | Hawthorne | Oct. 16, 1917 |
| 1,243,408 | Hawthorne | Oct. 16, 1917 |
| 1,869,457 | Benoit | Aug. 2, 1932 |
| 2,358,447 | Creamer | Sept. 19, 1944 |
| 2,371,027 | Cattonar et al. | Mar. 6, 1945 |
| 2,372,325 | Hein | Mar. 27, 1945 |
| 2,540,743 | Leach | Feb. 6, 1951 |
| 2,556,082 | Hartness | June 5, 1951 |
| 2,570,891 | Weaver et al. | Oct. 9, 1951 |
| 2,589,101 | Leguillon et al. | Mar. 11, 1952 |
| 2,643,780 | Rowe | June 30, 1953 |
| 2,650,746 | Rideout et al. | Sept. 1, 1953 |

FOREIGN PATENTS

| | | |
|---|---|---|
| 633,180 | Great Britain | Dec. 12, 1949 |